US012601298B2

(12) United States Patent
Morris et al.

(10) Patent No.: US 12,601,298 B2
(45) Date of Patent: *Apr. 14, 2026

(54) TURBINE ENCLOSURE VENTILATION AIR DUCTING FOR AIR HANDLING TRANSPORT

(71) Applicant: Typhon Technology Solutions (U.S.), LLC, The Woodlands, TX (US)

(72) Inventors: Jeffrey G. Morris, The Woodlands, TX (US); Steve F. Ballinger, Ponca City, OK (US); William Bruce Greenshields, Stillwater, OK (US); Allen Green, Ponca City, OK (US); Matthew Michel, Shoreview, MN (US); Thomas Wilson Robertson, Mandeville, LA (US); Dave Routhier, Winnipeg (CA)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/283,375

(22) Filed: Jul. 29, 2025

(65) Prior Publication Data

US 2026/0028938 A1     Jan. 29, 2026

Related U.S. Application Data

(63) Continuation of application No. 18/785,380, filed on Jul. 26, 2024, now Pat. No. 12,392,291.

(51) Int. Cl.
*F02C 7/055* (2006.01)
*F02C 7/20* (2006.01)

(52) U.S. Cl.
CPC ................ *F02C 7/20* (2013.01); *F02C 7/055* (2013.01); *F05D 2220/76* (2013.01); *F05D 2240/14* (2013.01); *F05D 2260/607* (2013.01)

(58) Field of Classification Search
CPC ........ F02C 7/20; F02C 7/055; F05D 2220/76; F05D 2240/14; F05D 2260/607
See application file for complete search history.

(56) References Cited

U.S. PATENT DOCUMENTS

| | | | |
|---|---|---|---|
| 11,598,477 B1 | 3/2023 | Seldenrust et al. | |
| 11,725,582 B1 | 8/2023 | Morris et al. | |

(Continued)

OTHER PUBLICATIONS

PCT International Search Report and Written Opinion, PCT Application No. PCT/US2024/039784, Oct. 21, 2024, 10 pages.

(Continued)

*Primary Examiner* — Steven M Sutherland
(74) *Attorney, Agent, or Firm* — Fenwick & West LLP

(57) ABSTRACT

An air handling transport includes a base frame and a combustion air module mounted to the base frame. The combustion air module includes a combustion air plenum for providing filtered combustion air to a turbine mounted on a separate transport. The transport further includes a ventilation air module mounted to the base frame. The ventilation air module provides filtered ventilation air to an enclosure for the turbine mounted on the separate transport. The ventilation air module includes a ventilation air compartment, a ventilation air duct, and a ventilation air plenum. The ventilation air duct is in the base frame and extends below the ventilation air compartment, the combustion air module, and the ventilation air plenum. The ventilation air duct couples the ventilation air compartment to the ventilation air plenum.

20 Claims, 14 Drawing Sheets

(56)        References Cited

U.S. PATENT DOCUMENTS

| | | |
|---|---|---|
| 11,788,668 B1 | 10/2023 | Seldenrust et al. |
| 2016/0369609 A1 | 12/2016 | Morris et al. |
| 2018/0080377 A1 | 3/2018 | Austin et al. |
| 2019/0063341 A1 | 2/2019 | Davis |
| 2019/0204021 A1 | 7/2019 | Morris et al. |
| 2020/0347725 A1 | 11/2020 | Morris et al. |
| 2020/0408144 A1 | 12/2020 | Feng et al. |
| 2020/0408149 A1 | 12/2020 | Li et al. |
| 2021/0071574 A1 | 3/2021 | Feng et al. |
| 2021/0180517 A1 | 6/2021 | Zhou et al. |
| 2021/0215440 A1 | 7/2021 | Morris et al. |
| 2021/0351660 A1 | 11/2021 | Morris et al. |
| 2022/0259964 A1 | 8/2022 | Zhang et al. |
| 2023/0156974 A1 | 5/2023 | Lewis et al. |
| 2023/0349279 A1 | 11/2023 | Zhang et al. |
| 2023/0349325 A1 | 11/2023 | Morris et al. |

OTHER PUBLICATIONS

PCT International Search Report and Written Opinion, PCT Application No. PCT/US2024/039780, Oct. 11, 2024, 12 pages.
United States Office Action, U.S. Appl. No. 18/785,380, Feb. 27, 2025, six pages.

200

260

223

220

224

262

222

226

223

264

263

1000

1010

1032

1042

1022

1005

1015

1000

1010

1015

1032

1042

1022

1005

Figure 13:
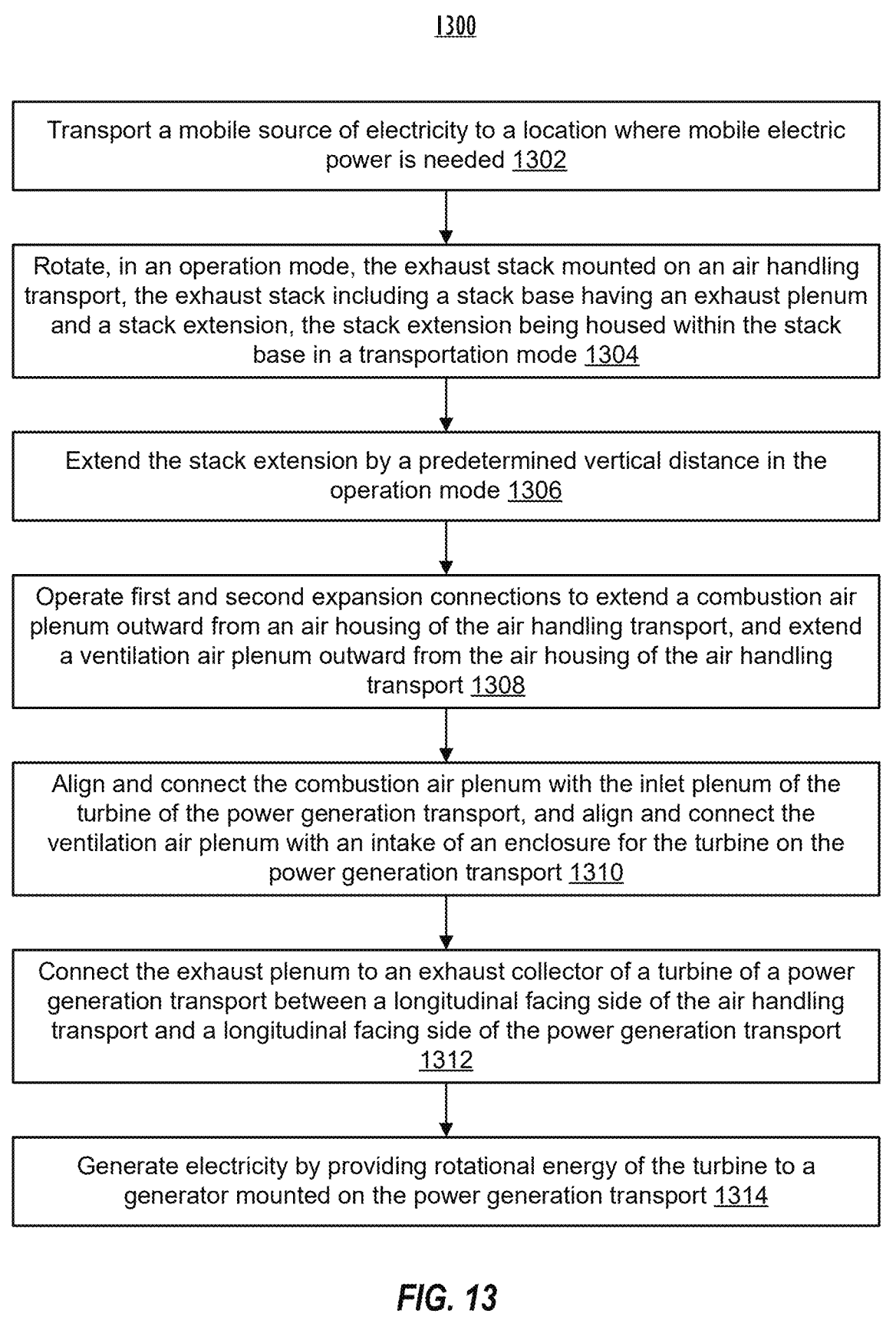

1300

Transport a mobile source of electricity to a location where mobile electric power is needed 1302

↓

Rotate, in an operation mode, the exhaust stack mounted on an air handling transport, the exhaust stack including a stack base having an exhaust plenum and a stack extension, the stack extension being housed within the stack base in a transportation mode 1304

↓

Extend the stack extension by a predetermined vertical distance in the operation mode 1306

↓

Operate first and second expansion connections to extend a combustion air plenum outward from an air housing of the air handling transport, and extend a ventilation air plenum outward from the air housing of the air handling transport 1308

↓

Align and connect the combustion air plenum with the inlet plenum of the turbine of the power generation transport, and align and connect the ventilation air plenum with an intake of an enclosure for the turbine on the power generation transport 1310

↓

Connect the exhaust plenum to an exhaust collector of a turbine of a power generation transport between a longitudinal facing side of the air handling transport and a longitudinal facing side of the power generation transport 1312

↓

Generate electricity by providing rotational energy of the turbine to a generator mounted on the power generation transport 1314

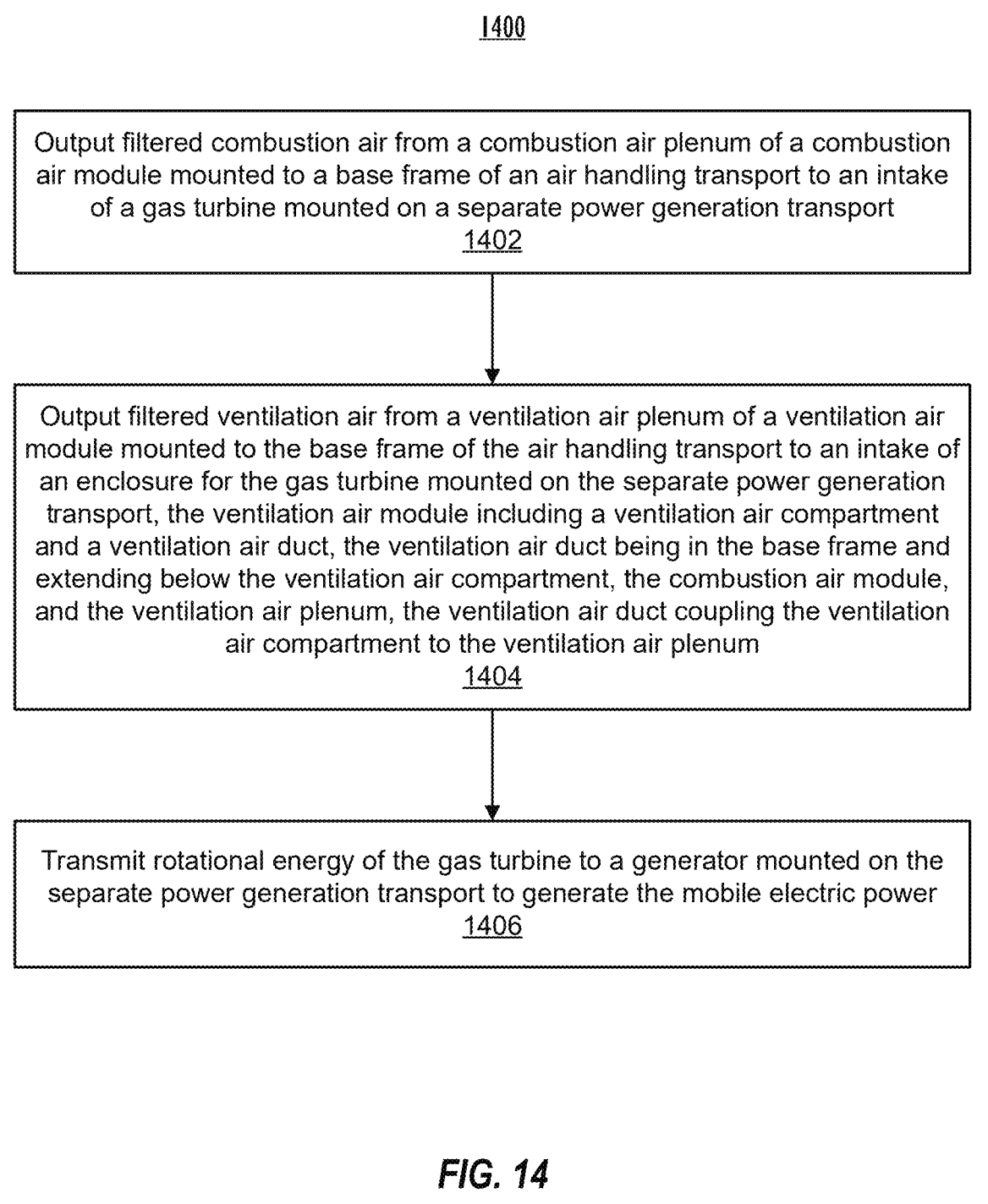

Output filtered combustion air from a combustion air plenum of a combustion air module mounted to a base frame of an air handling transport to an intake of a gas turbine mounted on a separate power generation transport
1402

Output filtered ventilation air from a ventilation air plenum of a ventilation air module mounted to the base frame of the air handling transport to an intake of an enclosure for the gas turbine mounted on the separate power generation transport, the ventilation air module including a ventilation air compartment and a ventilation air duct, the ventilation air duct being in the base frame and extending below the ventilation air compartment, the combustion air module, and the ventilation air plenum, the ventilation air duct coupling the ventilation air compartment to the ventilation air plenum
1404

Transmit rotational energy of the gas turbine to a generator mounted on the separate power generation transport to generate the mobile electric power
1406

*FIG. 14*

TURBINE ENCLOSURE VENTILATION AIR DUCTING FOR AIR HANDLING TRANSPORT

CROSS REFERENCE TO RELATED APPLICATIONS

This application is a continuation of co-pending U.S. application Ser. No. 18/785,380, Filed Jul. 26, 2024, which is Incorporated by Reference in its Entirety.

TECHNICAL FIELD

Embodiments of the invention generally relate to mobile electric power generation, and more particularly to an air handling transport of a mobile electric power generation system.

BACKGROUND

The demand for reliable and portable electric power continues to grow in various applications. These applications include oil and gas exploration, hydraulic fracking, data centers, agriculture, greenhouses, temperature regulation, disaster relief efforts, construction sites, remote locations lacking access to the grid, and situations where temporary power surges are required.

Traditional methods for mobile power generation rely on internal combustion engines (ICEs) coupled to generators. While ICEs offer a readily available energy source and can be relatively compact, they suffer from several drawbacks. ICEs typically have lower fuel efficiency compared to gas turbines, leading to higher operating costs and increased emissions. Additionally, ICEs require frequent maintenance, impacting their uptime and reliability.

While trailer-mounted gas turbine generator systems offer a compelling solution for mobile power needs, several challenges hinder their widespread adoption. First, the sheer size and weight of a gas turbine, coupled with the necessary generator and auxiliary equipment, create a complex system. This translates to difficulties in transportation and deployment, especially in remote locations or situations requiring rapid response. Second, the inherent noise pollution generated by gas turbines can be a limiting factor, particularly in densely populated areas or environmentally sensitive locations. Finally, the high operating temperatures of gas turbines, generators, and related ancillary equipment necessitate sophisticated cooling systems. These systems often involve large radiators or complex air intake and exhaust configurations, further contributing to the overall size and complexity of the system. This can make them cumbersome to set up and potentially lead to additional permitting requirements depending on noise and emission regulations. Addressing these challenges in size, operational complexity, and noise emission is crucial for expanding the practical applications of mobile gas turbine power generation.

SUMMARY

An air handling transport in one or more embodiments includes a base frame, and an air housing mounted to the base frame. The air housing includes a combustion air plenum on a longitudinal side of the air handling transport. The combustion air plenum outputs filtered combustion air. The air handling transport further includes an exhaust stack mounted to the base frame for releasing combustion exhaust air. The exhaust stack is rotatable between the longitudinal side in an operation mode and an end side in a transportation mode. The exhaust stack includes a stack base having an exhaust plenum and a stack extension. The stack extension is housed within the stack base in the transportation mode and extend vertically by a predetermined vertical distance in the operation mode.

A system for generating mobile electric power in one or more embodiments includes an air handling transport and a power generation transport including a gas turbine, a generator, an inlet plenum, and an exhaust collector. The air handling transport includes a base frame and an air housing mounted to the base frame. The air housing includes a combustion air plenum on a longitudinal side of the air handling transport. The combustion air plenum is connected to the inlet plenum of the gas turbine in an operation mode. The air handling transport further includes exhaust stack mounted to the base frame. The exhaust stack is rotatable between the longitudinal side in the operation mode and an end side in a transportation mode. The exhaust stack includes a stack base having an exhaust plenum and a stack extension. The stack extension is housed within the stack base in the transportation mode and extend vertically by a predetermined vertical distance in the operation mode.

A method for generating mobile electric power in one or more embodiments includes a plurality of steps. The steps include a step of rotating, in an operation mode, an exhaust stack mounted on an air handling transport. The exhaust stack includes a stack base having an exhaust plenum and a stack extension. The stack extension is housed within the stack base in a transportation mode. The steps further include a step of raising the stack extension vertically by a predetermined vertical distance in the operation mode. The steps further include a step of connecting the exhaust plenum in the operation mode to an exhaust collector of a turbine of a power generation transport between a longitudinal facing side of the air handling transport and a longitudinal facing side of the power generation transport.

An air handling transport in one or more embodiments includes a base frame and a combustion air module mounted to the base frame. The combustion air module includes a combustion air plenum for providing filtered combustion air to a turbine mounted on a separate transport. The air handling transport further includes a ventilation air module mounted to the base frame. The ventilation air module provides filtered ventilation air to an enclosure for the turbine mounted on the separate transport. The ventilation air module includes a ventilation air compartment, a ventilation air duct, and a ventilation air plenum. The ventilation air duct is in the base frame and extends below the ventilation air compartment, the combustion air module, and the ventilation air plenum. The ventilation air duct couples the ventilation air compartment to the ventilation air plenum.

A system for generating mobile electric power in one or more embodiments includes an air handling transport and a power generation transport including a gas turbine and a generator. The air handling transport includes a base frame and a combustion air module mounted to the base frame. The combustion air module includes a combustion air plenum for providing filtered combustion air to the gas turbine. The air handling transport further includes a ventilation air module mounted to the base frame. The ventilation air module provides filtered ventilation air to an enclosure for the gas turbine mounted on the power generation transport. The ventilation air module includes a ventilation air compartment, a ventilation air duct, and a ventilation air plenum. The ventilation air duct is in the base frame and extends below the ventilation air compartment, the combustion air module, and the ventilation air plenum. The ventilation air duct couples the ventilation air compartment to the ventilation air plenum.

A method for generating mobile electric power in one or more embodiments includes a plurality of steps. The steps include a step of outputting, from a combustion air plenum of a combustion air module mounted to a base frame of an air handling transport, filtered combustion air to an intake of a gas turbine mounted on a separate power generation transport. The steps further include a step of outputting, from a ventilation air plenum of a ventilation air module mounted to the base frame of the air handling transport, filtered ventilation air to an intake of an enclosure for the gas turbine mounted on the separate power generation transport. The ventilation air module includes a ventilation air compartment and a ventilation air duct. The ventilation air duct is in the base frame and extends below the ventilation air compartment, the combustion air module, and the ventilation air plenum. The ventilation air duct couples the ventilation air compartment to the ventilation air plenum. The steps further include a step of transmitting rotational energy of the gas turbine to a generator mounted on the separate power generation transport to generate the mobile electric power.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 13 is a flow chart illustrating a process for converting an air handling transport to an operation mode for generating mobile electric power, in accordance with one or more embodiments.

FIG. 14 is a flow chart illustrating a process for generating mobile electric power, in accordance with one or more embodiments.

DETAILED DESCRIPTION

Figure 1:
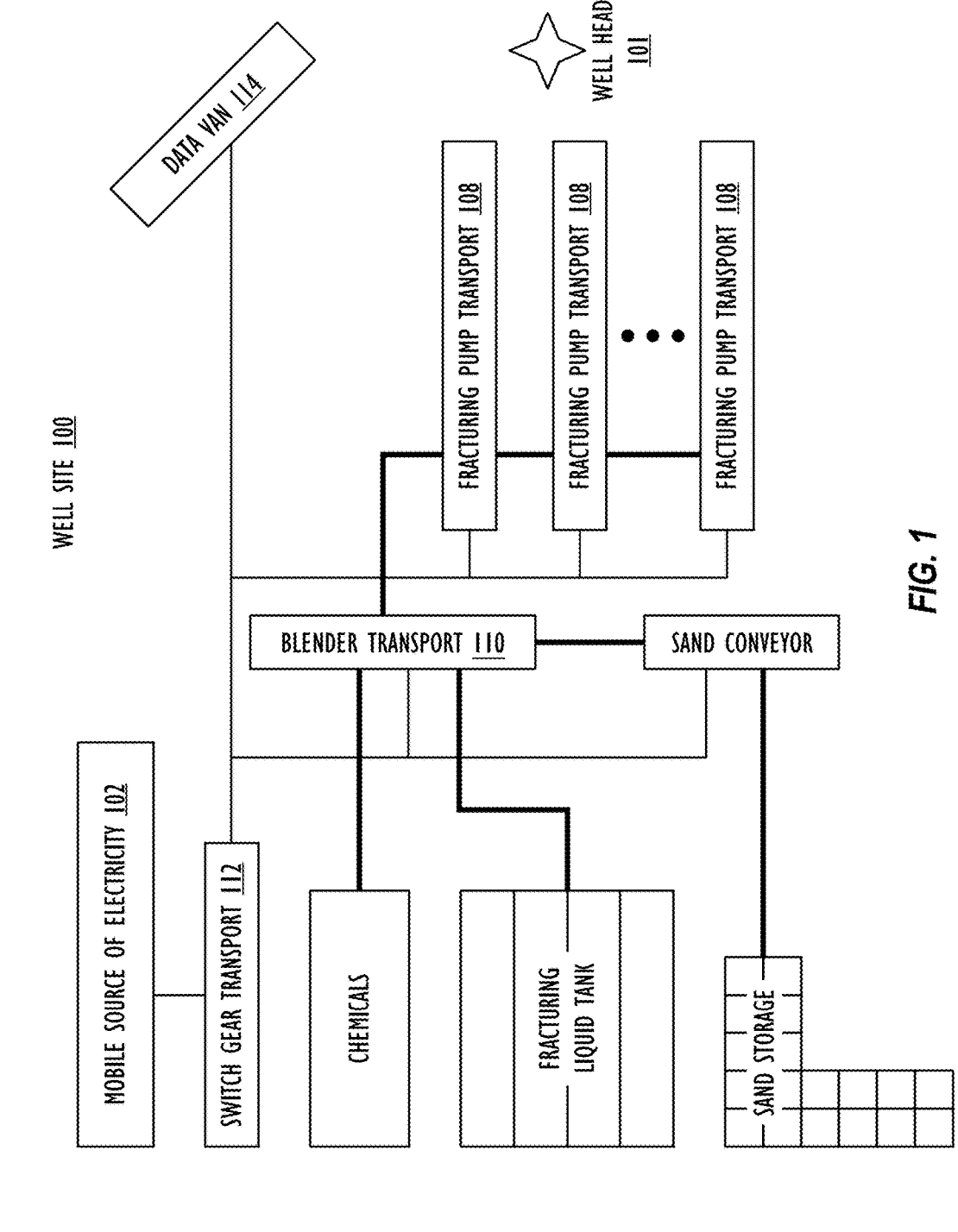
FIG. 1 is a schematic diagram of a mobile hydraulic fracturing system operating at a well site, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In the following description, for purposes of explanation, numerous specific details are set forth to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all the listed items unless explicitly so defined.

As used herein, the term "transport" refers to any transportation assembly, including, but not limited to, a trailer, truck, skid, and/or barge used to transport heavy structures, such as a gas turbine, a generator, a power generation system, an air handling system, and the like.

As used herein, the term "trailer" refers to a transportation assembly used to transport heavy structures, such as a gas turbine, a generator, a power generation system, an air handling system, and the like, that can be attached and/or detached from a transportation vehicle used to pull or move the trailer. In one embodiment, the trailer may include the mounts and manifold systems to connect the trailer to other equipment.

Configuration Overview

A mobile source of electricity (e.g., mobile electric power generation system, and the like) may be configured to provide mobile electric power for different applications or use cases. The mobile source of electricity may be implemented using a plurality of transports (e.g., two transports). The plurality of transports of the mobile source of electricity may include a power generation transport and an air handling transport. In one or more embodiments, the power generation transport may include at least a gas turbine and a generator, and the air handling transport may include at least an air housing and an exhaust stack.

The power generation transport and the air handling transport are separately and independently movable in a transportation mode. During an operation mode, the power generation transport and the air handling transport are connectable to each other without requiring any external mechanical equipment to interconnect the transports. The power generation transport and the air handling transport are connectable between the longitudinal facing sides of the two transports.

The mobile source of electricity may have different power output ratings based on the application and the type of gas turbine and generator mounted on the power generation transport. Different gas turbines may have different dimensions. As a result, each power generation transport of a particular type (i.e., having a particular type of gas turbine) may require a corresponding compatible air handling transport whose intake and exhaust connections match the dimensions of the gas turbine installed on the power generation transport.

This disclosure pertains to providing a universal air handling transport that is operable with different types of power generation transports mounted with different types of gas turbines having different dimensions and power output ratings. In one or more embodiments, the air handling transport includes a rotating and telescoping exhaust stack that is adapted to slide in a longitudinal direction of the air handling transport to connect with power generation transports having gas turbines of varying dimensions. In the transportation mode, the exhaust stack may be rotated to position an exhaust plenum toward an end side of the air handling transport and a stack extension in a rest state housed within the stack base of the exhaust stack. In the operation mode, the exhaust stack may be rotated to position the exhaust plenum toward the longitudinal side of the air handling transport facing the power generation transport to connect with an exhaust collector of the gas turbine on the power generation transport, and the stack extension may slide out vertically from the stack base, lengthening the dimensions of the exhaust stack from its rest state, thereby reducing exhaust noise and safely releasing hot exhaust air into the atmosphere without posing danger to any equipment and/or an operator working in a vicinity of the power generation transport.

The air handling transport may also include ducting in the base frame to provide filtered ventilation and cooling air for an enclosure of the turbine mounted on the power generation transport. The ventilation air duct enables a ventilation air compartment for filtering ambient air to be positioned distally from a ventilation air plenum connected to the enclosure of the turbine between the facing sides of the two transports. Positioning the ventilation air compartment distally provides several advantages. First, the configuration allows dimensions of the ventilation air compartment of the air handling transport to be made bigger, allowing room for more filters and fans, thereby providing redundancy, and increasing the ventilation air flow. Second, placing the ventilation air compartment distally from the ventilation air plenum ensures the hot exhaust air released from the exhaust stack does not flow into the ventilation air compartment. Since the ventilation air duct may be integrated into the base frame of the air handling transport, overall dimensions of the air handling transport may be reduced, resulting in a compact configuration.

The mobile electric power generation system may be configured to be 'self-sufficient' such that it can be quickly mobilized and de-mobilized without requiring use of external mechanical equipment or apparatus. For example, the mobile source of electricity may improve mobility by enabling a mobilization and de-mobilization time period of less than 24 hours. The mobile source of electricity may also incorporate a two-transport footprint, where the same two transports may be used for the transportation mode and the operation mode without requiring any external mechanical equipment for mobilization and/or demobilization. After reaching a remote site where a mobile source of electricity is required, the power generation transport and the air handling transport can be quickly converted from the transportation mode to the operation mode by, e.g., positioning and interconnecting the two transports, supplying hydrocarbon fuel to the gas turbine, and further making the required electrical interconnect. The gas turbine and the generator of the power generation transport may then be operated to generate electricity. After the mobile source of electricity is no longer required at the remote site, the mobile electric power generation system can be quickly mobilized to the transportation mode without use of any external mechanical equipment. In the operation mode, the power generation system may produce electric power in the range of about 5-60 megawatts (MW).

The mobile source of electricity may have different applications where mobile electric power is needed and where the requisite hydrocarbon fuel (e.g., natural gas) required to power the gas turbine is available. As a specific non-limiting example, the system may power electric hydraulic fracturing operations for one or more well sites by providing electric power to a variety of fracturing equipment located at the well sites. The different fracturing equipment, which include, but are not limited to, a blender, hydration unit, fracturing pump transport(s), sand handling equipment, chemical additive system, and the mobile source of electricity, may be configured to operate remotely via a control network system that monitors and controls the fracturing equipment using a communication network.

Example Mobile Hydraulic Fracturing System

FIG. 1 illustrates an example well site environment 100 where a mobile source of electricity 102 including the air handling transport according to the present disclosure may operate. In FIG. 1, a mobile hydraulic fracturing system 103 operates at the well site environment 100 and includes a mobile source of electricity 102 to generate mobile electric power. The well site environment 100 comprises a wellhead 101 (e.g., frac pad including multiple wells) and the mobile fracturing system 103 (e.g., hydraulic fracturing fleet, frac fleet or system). Generally, the mobile fracturing system 103 may perform fracturing operations to complete a well and/or transform a drilled well into a production well. For example, the well site 100 may be a site where operators are in the process of drilling and completing a well. Operators may start the well completion process (e.g., well completion operation) after drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and the mobile fracturing system 103 may be moved onto the well site 100 to perform the well completion operation (e.g., fracturing operation) that forces relatively high-pressure fracturing fluid through the wellhead 101 into subsurface geological formations to create fissures and cracks within the rock. The mobile fracturing system 103 may be moved off the well site 100 once the operators complete the well completion operation. Typically, the well completion operation for the well site 100 may last several days and even up to multiple months.

In some embodiments, the mobile fracturing system 103 may comprise a mobile source of electricity 102 (e.g., mobile electric power generation system) configured to generate electricity by converting hydrocarbon fuel, such as natural gas, obtained from one or more sources (e.g., a producing wellhead) at the well site 100, from a remote offsite location, and/or another relatively convenient location near the mobile source of electricity 102. That is, the mobile fracturing system 103 may utilize the mobile source of electricity 102 as a power source that burns cleaner while being transportable along with other fracturing equipment of the system 103. The generated electricity from the mobile source of electricity 102 may be supplied to fracturing equipment to power fracturing operations at one or more well sites, or to other equipment in several types of applications requiring mobile electric power generation.

In one or more embodiments, the mobile source of electricity 102 may be implemented as a two-trailer system including a power generation transport and an air handling transport. The power generation transport may comprise a turbine (e.g., gas turbine) and a generator, and the air handling transport may comprise a filter housing providing filtered combustion air for the turbine and filtered ventilation and cooling air for an enclosure of the turbine. The air handling transport may further include a rotating and telescoping exhaust stack that securely provides an exhaust system for exhaust air from the turbine as well as for exhausting ventilation and cooling air from one or more components (e.g., a gas turbine enclosure, a lube oil radiator enclosure, a generator compartment, a compartment including electronic components, electrical components, and the like) of the power generation transport. The air handling transport may further include ducting in the base frame to provide filtered ventilation and cooling air from a ventilation air compartment to a ventilation air plenum mounted to a side of the air handing transport in an operation mode. Embodiments of the air handling transport will be described in greater detail below in connection with FIGS. 2-14.

Although not shown in FIG. 1 (and as further illustrated in greater detail in FIGS. 2-14), the mobile source of electricity 102 may include a variety of equipment for mobile electric power generation including a gas conditioning skid, a black start generator, a power source (e.g., gas turbine), an inlet plenum, an exhaust collector, an air housing, an exhaust stack, a combustion air plenum, a ventilation air plenum, a generator exhaust air plenum, a gearbox, a generator shaft, a generator, electrical components, electronic components, a lube oil radiator, a generator breaker, a transformer, a starter motor, a control system, a turbine lube oil system, a fire suppression system, a generator lube oil system, and the like.

In one embodiment, the power source may be a gas turbine. In another embodiment, power source may be another type of power source (e.g., reciprocating engine). The gas turbine may generate mechanical energy (e.g., rotation of a shaft) from a hydrocarbon fuel source, such as natural gas, liquefied natural gas, condensate, and/or other liquid fuels. For example, a shaft of the gas turbine may be connected to the gearbox and the generator such that the generator converts the supplied mechanical energy from the rotation of the shaft of the gas turbine to produce electric power. The gas turbine may be a commercially available gas turbine such as the Baker Hughes NovaLT™ family of gas turbines, the General Electric LM6000 gas turbine, the General Electric LM2500 family of gas turbines, the Pratt and Whitney FT8 gas turbine, the Solar Titan, Mars, Taurus, Mercury, Siemens, or Saturn families of gas turbines, or any other similar gas turbine that can generate the necessary amount of mechanical power for the generator. The generator may be a commercially available generator such as a Brush generator, a WEG generator, or other similar generator configured to generate a compatible amount of electric power. For example, the combination of the gas turbine, the gearbox, and the generator within the mobile source of electricity 102 may generate electric power from a range of at least about 1 megawatt (MW) to about 60 MW (e.g., 16 MW, 35 MW, or 38 MW). Other types of gas turbine/ generator combinations with power ranges greater than about 60 MW or less than about 1 MW may also be used depending on the application requirement.

In addition to the mobile source of electricity 102, the mobile fracturing system 103 may include a switch gear transport 112, at least one blender transport 110, at least one data van 114, and one or more fracturing pump transports 108 that deliver fracturing fluid through the wellhead 101 to the subsurface geological formations. The switch gear transport 112 may receive electricity generated by the mobile source of electricity 102 via one or more electrical connections. In one embodiment, the switch gear transport 112 may use 13.8 kilovolts (KV) electrical connections to receive power from the mobile source of electricity 102. The switch gear transport 112 may transfer the electricity received from the mobile source of electricity 102 to electrically connected fracturing equipment of the mobile fracturing system 103. The switch gear transport 112 may comprise a plurality of electrical disconnect switches, fuses, transformers, and/or circuit protectors to protect the fracturing equipment. In some embodiments, switch gear transport 112 may be configured to step down a voltage received from the mobile source of electricity 102 to one or more lower voltages to power the fracturing equipment.

Each fracturing pump transport 108 may receive the electric power from the switch gear transport 112 to power a prime mover. The prime mover converts electric power to mechanical power for driving one or more fracturing pumps of the fracturing pump transport 108. In one embodiment, the prime mover may be a dual shaft electric motor that drives two different frac pumps mounted to each fracturing pump transport 108. Each fracturing pump transport 108 may be arranged such that one frac pump is coupled to opposite ends of the dual shaft electric motor and avoids coupling the pumps in series. By avoiding coupling the pump in series, fracturing pump transport 108 may continue to operate when either one of the pumps fails or has been removed from the fracturing pump transport 108. Additionally, repairs to the pumps may be performed without disconnecting the system manifolds that connect the fracturing pump transport 108 to other fracturing equipment within the mobile fracturing system 103 and the wellhead 101. The fracturing pump transport 108 may implement (in whole or in part) a system for predicting frac pump component life intervals and setting a continuous completion event for a well completion design.

The blender transport 110 may receive electric power fed through the switch gear transport 112 to power a plurality of electric blenders. In one or more embodiments, the blender transport 110 may function independently from the switch gear transport 112 and the mobile source of electricity 102 and be powered by other means such as a diesel engine or a natural gas reciprocating engine. A plurality of prime movers may drive one or more pumps that pump source fluid and blender additives (e.g., sand) into a blending tub, mix the source fluid and blender additives together to form fracturing fluid, and discharge the fracturing fluid to the fracturing pump transports 108. In one embodiment, the electric blender may be a dual configuration blender that comprises electric motors for the rotating machinery that are located on a single transport. In another embodiment, a plurality of enclosed mixer hoppers may be used to supply the proppants and additives into a plurality of blending tubs.

The data van 114 may be part of a control network system, where the data van 114 acts as a control center configured to monitor and provide operating instructions to remotely operate the mobile source of electricity 102, the fracturing pump transports 108, the blender transport 110, and/or other fracturing equipment within the mobile fracturing system 103. In one embodiment, the data van 114 may communicate with the variety of fracturing equipment using a control network system that has a ring topology (or star topology). A ring topology may reduce the amount of control cabling used for fracturing operations and increase the capacity and speed of data transfers and communication.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of the mobile fracturing system 103, one or more of the other fracturing equipment shown in FIG. 1 may be configured to receive power generated from the mobile source of electricity 102. The control network system for the mobile fracturing system 103 may remotely synchronize and/or slave the electric blender of the blender transport 110 with the electric motors of the fracturing pump transports 108.

Example Mobile Source of Electricity

Figure 2:
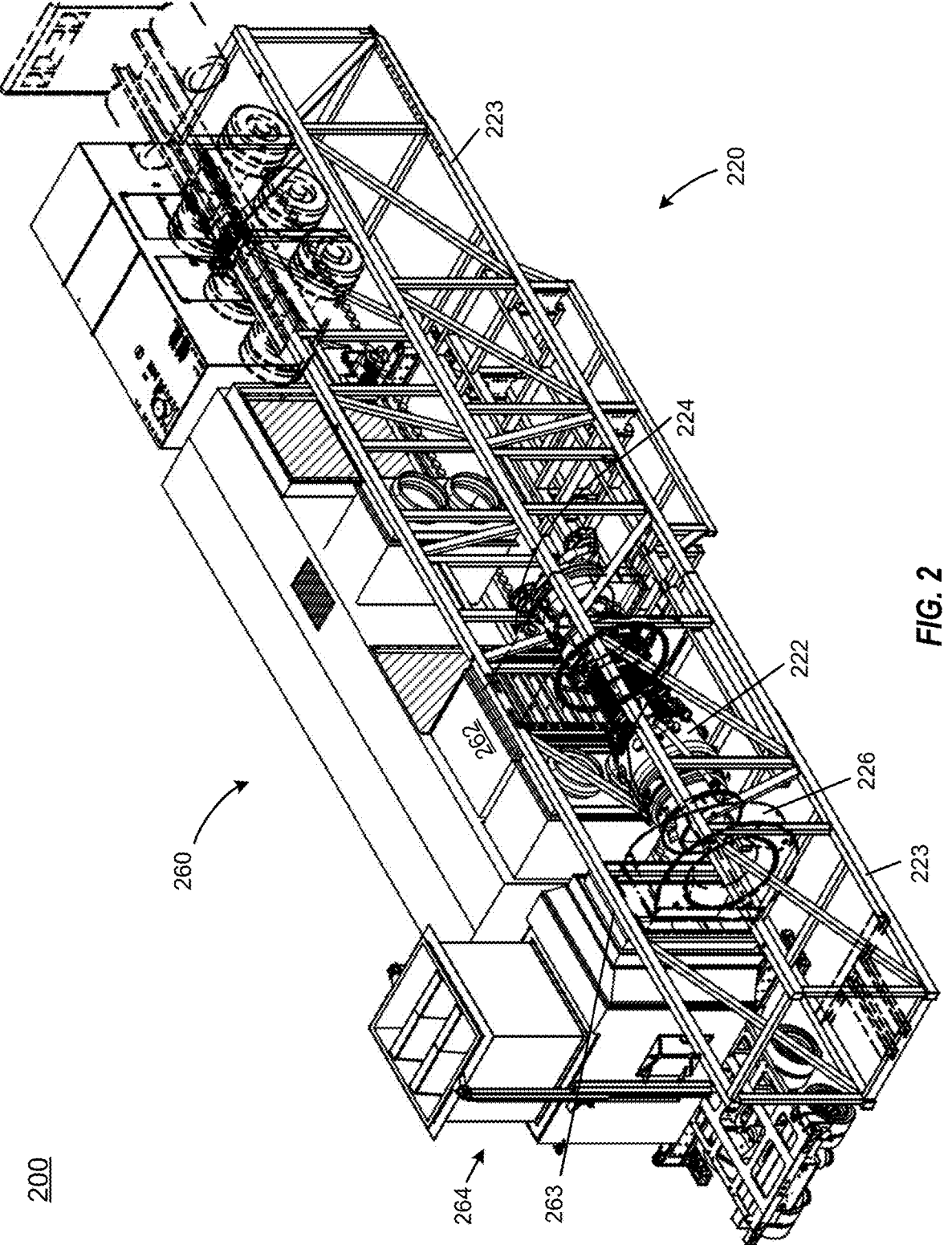
FIG. 2 is a schematic diagram showing a perspective view of a mobile source of electricity in an operation mode, in accordance with one or more embodiments.

FIG. 2 is a schematic diagram showing a perspective view of a mobile source of electricity 200 in an operation mode, in accordance with one or more embodiments. In FIG. 2, the mobile source of electricity 200 includes a power generation transport 220 and an air handling transport 260. The components of the power generation transport 220 are partially hidden to simplify the drawing and enable understanding of the interconnection of the two transports 220 and 260.

As shown in FIG. 2, the power generation transport 220 may comprise components including a gas turbine 222 and a generator (not shown). An inlet plenum 224 may be connected to an intake of the gas turbine 222 and configured to intake filtered combustion air from a combustion air plenum 262 of the air handling transport 260 and supply the filtered combustion air to the intake of the gas turbine 222. The gas turbine 222 generates mechanical energy (i.e., rotation of a shaft) from a hydrocarbon fuel source, such as natural gas, liquefied natural gas, condensate, and/or other liquid fuels. The gas turbine 222 has a shaft that is connected to the generator (not shown) such that the generator converts the supplied mechanical energy from the rotation of the shaft to produce electric power. An exhaust collector 226 may be connected to an exhaust of the gas turbine 222 and configured to collect exhaust air discharged from the gas turbine 222 and supply the exhaust air to an exhaust plenum 263 of an exhaust stack 264 of the air handling transport 260.

To improve mobility over a variety of roadways, the power generation transport 220 may have a maximum height of about 13 feet and 6 inches, a maximum width of about 119 inches, and a maximum length of about 80 feet. Further, the power generation transport 220 may comprise at least three axles used to support and distribute the weight on the power generation transport 220. Other embodiments of the power generation transport 220 may be transports that exceed three axles depending on the total transport weight. The dimensions and the number of axles may be adjusted to allow for the transport 220 to be able to navigate over roadways that typically mandate certain height, length, and weight restrictions.

In one or more embodiments, the gas turbine 222, the generator, and the other components of the power generation transport 220 may be mounted to an engineered transport frame 223, a sub-base, sub-skid, or any other sub-structure used to support the mounting of the components. The engineered transport frame 223 may be used to align the connections between the gas turbine 222, the generator, the inlet plenum 224, and the exhaust collector 226, and/or lower the gas turbine 222 and the generator by configuring for a flush mount to the engineered transport frame 223. The engineered transport frame 223 may allow for easier alignment and connection of the gas turbine 222 and the generator compared to using separate sub-base for the gas turbine 222 and the generator. Other embodiments of the power generation transport 220 may use a plurality of sub-bases by, for example, mounting the gas turbine 222 on one sub-base and mounting the generator on another sub-base.

To improve mobility of the power generation transport 220, the inlet plenum 224 and the exhaust collector 226 are provided on the longitudinal side of the power generation transport 220 that faces the air handling transport 260 in the operation mode. Similarly, to improve mobility of the air handling transport 260, the combustion air plenum 262 and the exhaust plenum 263 are also provided on the longitudinal side of the air handling transport 260 that faces the power generation transport 220 in the operation mode. Embodiments of the air handling transport 260 are described in detail below in connection with FIGS. 3-14.

Example Air Handling Transport

Figure 3:
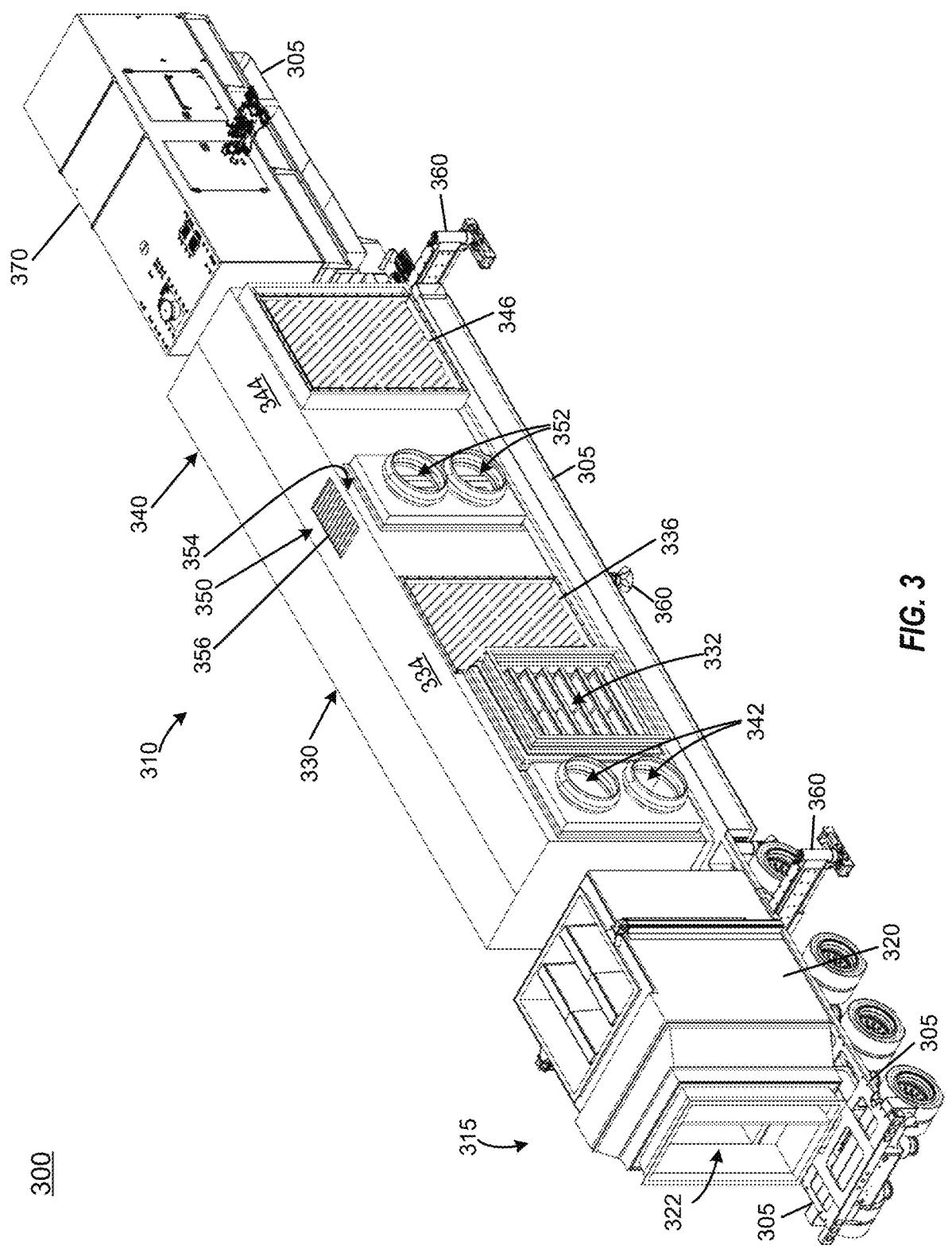
FIG. 3 is a schematic diagram showing a perspective view of an air handling transport in a transportation mode, in accordance with one or more embodiments.
Figure 4:
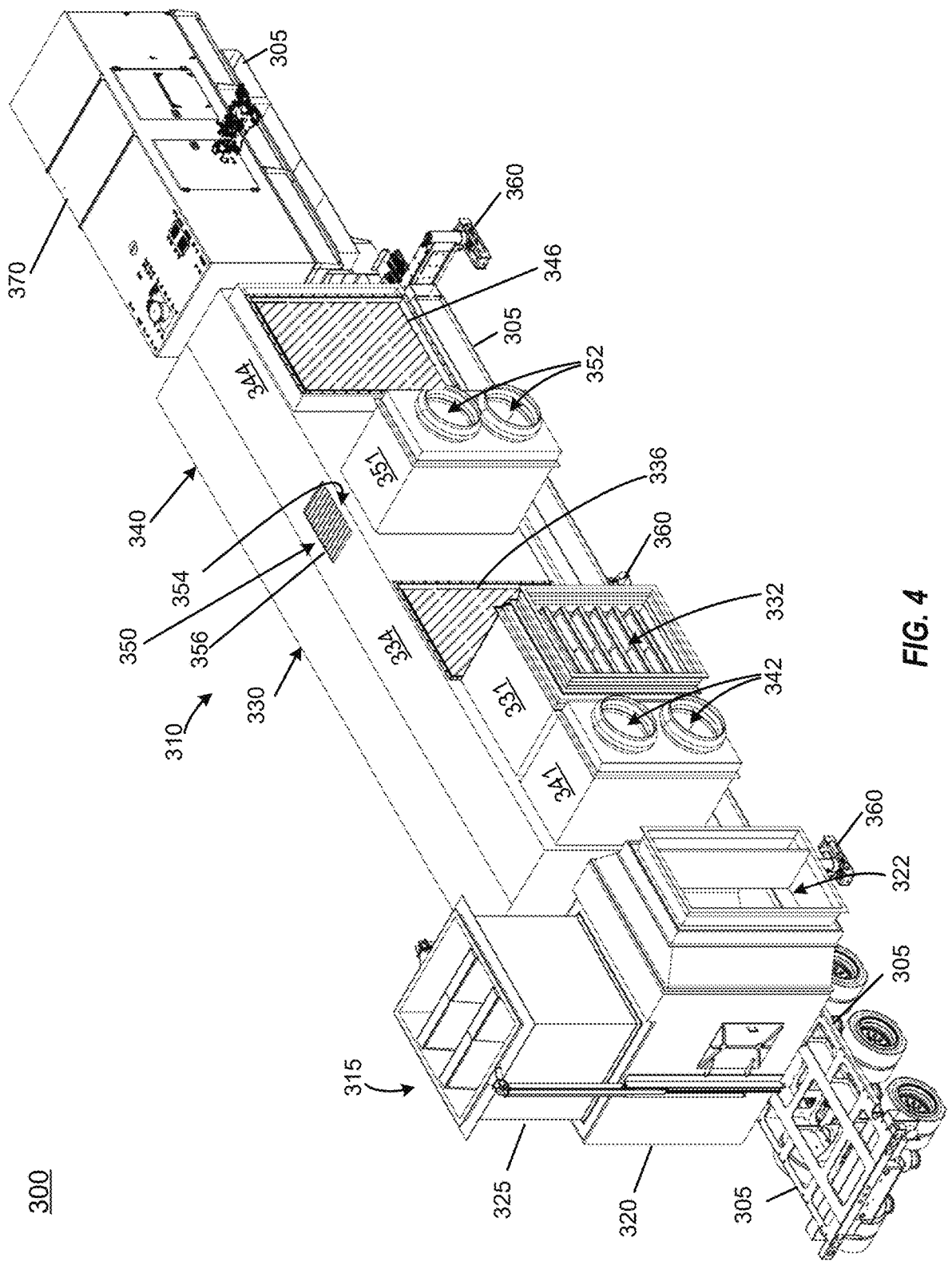
FIG. 4 is a schematic diagram showing a perspective view of an air handling transport in an operation mode, in accordance with one or more embodiments.
Figure 5:
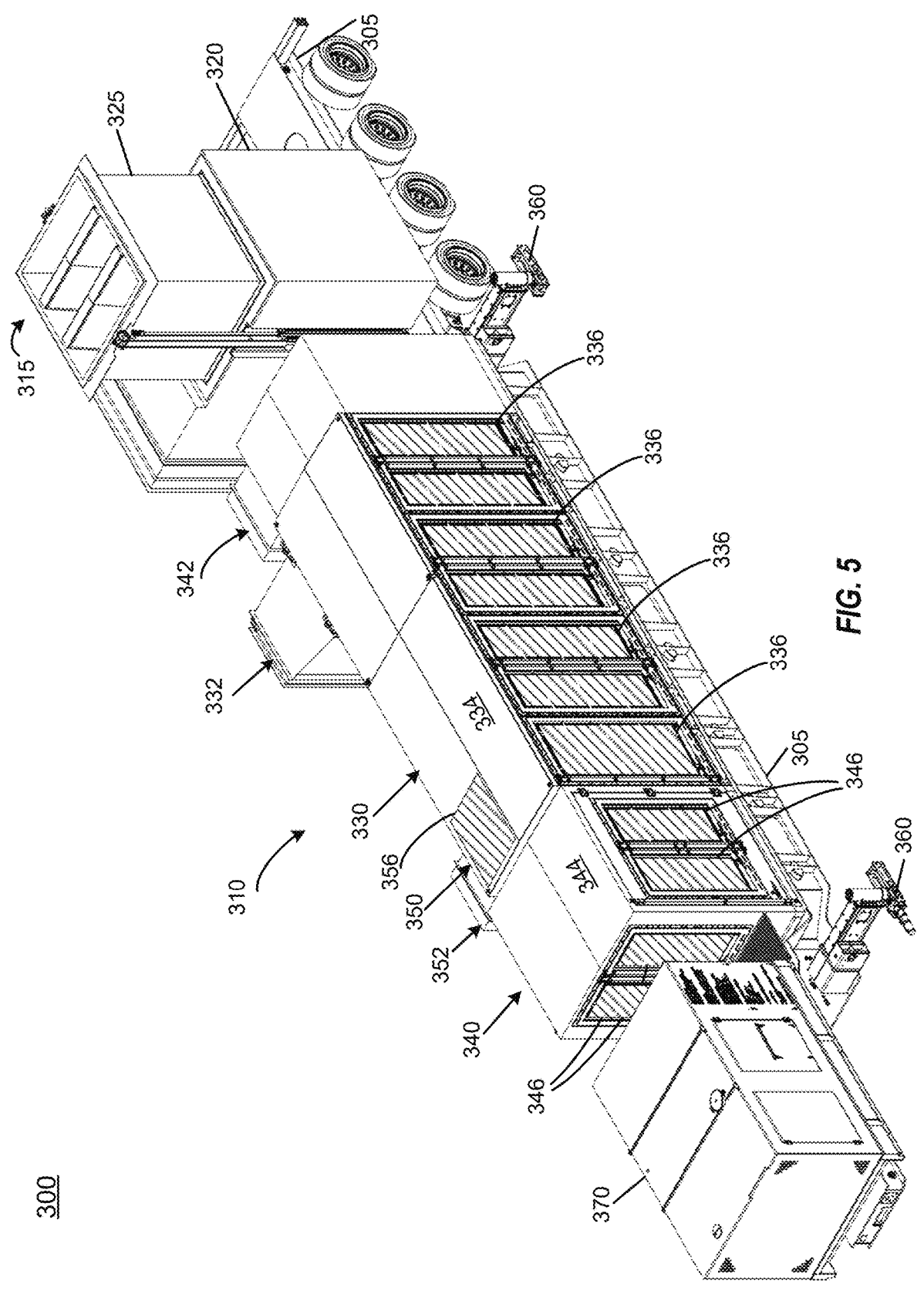
FIG. 5 is a schematic diagram showing another perspective view of an air handling transport in an operation mode, in accordance with one or more embodiments.

FIG. 3 is a schematic diagram showing a perspective view of an air handling transport 300 in a transportation mode, in accordance with one or more embodiments. FIG. 4 is a schematic diagram showing a perspective view of a first longitudinal side of the air handling transport 300 that faces the power generation transport in an operation mode, in accordance with one or more embodiments. FIG. 5 is a schematic diagram showing a perspective view of a second longitudinal side of the air handling transport 300 that faces away from the power generation transport in an operation mode, in accordance with one or more embodiments.

As shown in FIGS. 3-5, the air handling transport 300 includes a base frame 305, an air housing 310 mounted to the base frame 305, an exhaust stack 315 mounted to the base frame 305 for releasing combustion exhaust air. FIGS. 3-5 show that the exhaust stack 315 is rotatable between the longitudinal side in an operation mode (FIGS. 4-5) and an end side in the transportation mode (FIG. 3). The exhaust stack includes a stack base 320 having an exhaust plenum 322 and a stack extension 325.

FIG. 3 shows that the stack extension 325 is housed within the stack base 320 in the transportation mode. FIGS. 4-5 show that the stack extension 325 extends vertically by a predetermined vertical distance (e.g., around 8 feet) in the operation mode. That is, as shown in FIG. 3, the stack extension 325 in the rest state during transport retracts and slides inside the stack base 320. And as shown in FIGS. 4-5, in the operation mode, the stack extension 325 telescopes or slides out from the top of the stack base by a predetermined distance to be project by a predetermined vertical distance. The stack base 320 may be cold skinned and mounted to the base frame 305 via a slewing bearing to allow for rotation of the entire exhaust stack 315. The stack extension 325 may be hot skinned and adapted to telescope into and out of the stack base for transportation and operation.

In one or more embodiments, the air housing 310 may include a combustion air module 330, a ventilation air module 340, and a generator exhaust air module 350. The combustion air module 330 is mounted to the base frame 305 and includes a combustion air plenum 332 and a combustion air compartment 334 including a plurality of air filters 336 for providing filtered combustion air to the combustion air plenum 332, the filtered combustion air being output from combustion air plenum 332 to the inlet plenum of the gas turbine of the power generation transport.

The ventilation air module 340 is mounted to the base frame 305 and includes a ventilation air plenum 342 and a ventilation air compartment 344 including a plurality of air filters 346 for providing filtered ventilation air that is output from the ventilation air plenum 342 to an enclosure for the gas turbine mounted on the power generation transport. Although not shown in FIGS. 3-5, the ventilation air module 340 includes a ventilation air duct is in the base frame 305 and extends below the ventilation air compartment 344, the combustion air module 330 (including the combustion air compartment 334, the combustion air plenum 332), and the ventilation air plenum 342. The ventilation air duct couples the ventilation air compartment 344 to the ventilation air plenum 342. Configuration of the ventilation air duct is described in detail in connection with FIGS. 6A-6B.

Figures 6A, 6B:
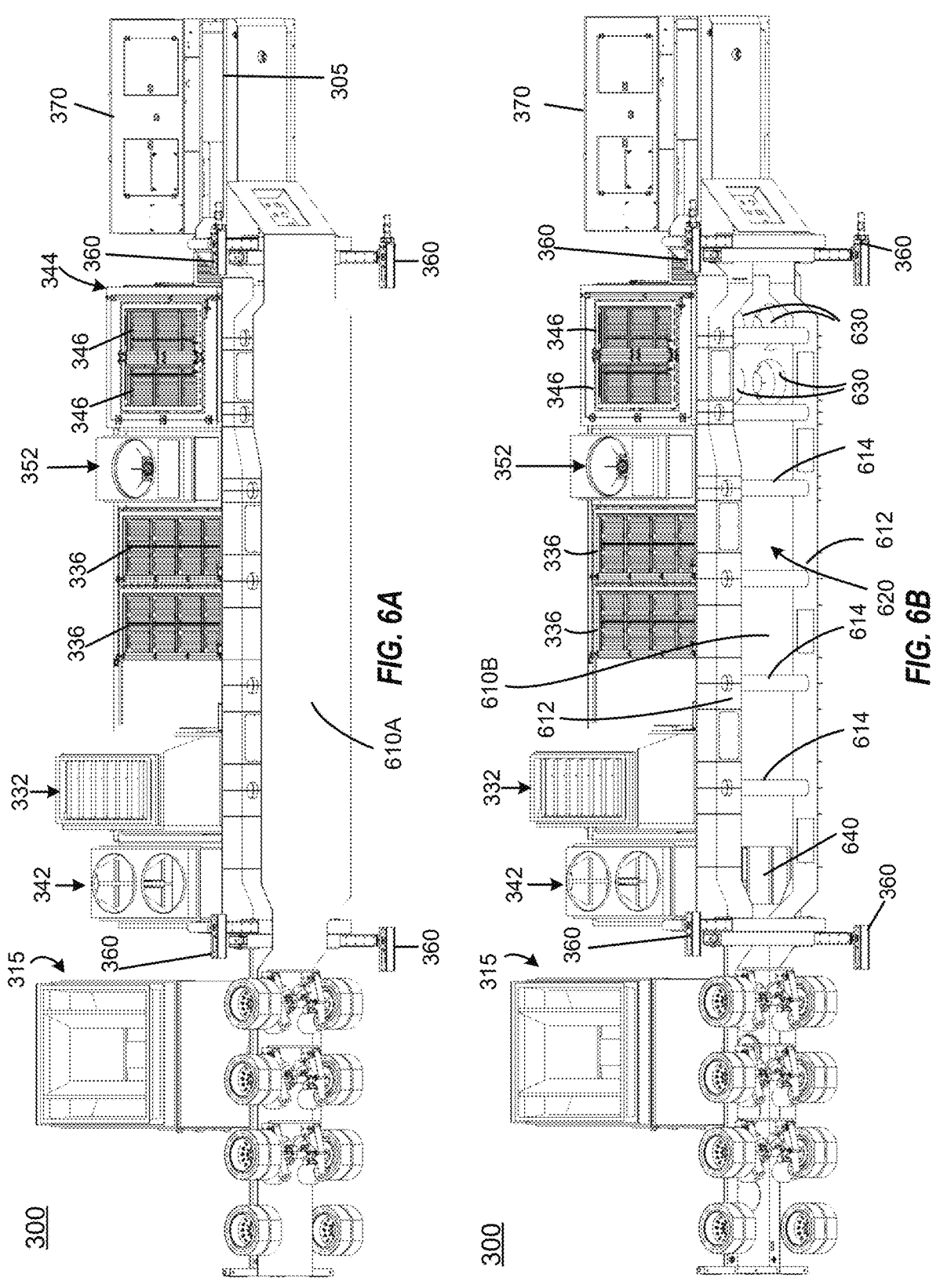
FIG. 6A is a schematic diagram showing a bottom perspective view of an air handling transport, in accordance with one or more embodiments.
FIG. 6B is a schematic diagram showing a ventilation air duct of a ventilation air module of the air handling transport of FIG. 6A, in accordance with one or more embodiments.

FIG. 6A is a schematic diagram showing a bottom perspective view of the air handling transport 300 in the operation mode, in accordance with one or more embodiments. FIG. 6B is a schematic diagram showing a ventilation air duct of a ventilation air module of the air handling transport 300 of FIG. 6A, in accordance with one or more embodiments.

FIGS. 3-6B show that the ventilation air compartment 344 includes air filters 346 mounted on at least three sides of the air handling transport 300. That is, FIG. 5 shows that the air filters 346 are provided on the end side of the air housing 310 that is opposite to the end side of the air housing 310 adjacent to the exhaust stack 315. And FIGS. 3-6B show that the air filters 346 are also provided on the two longitudinal sides of the air housing 310, the first longitudinal side of the air handling transport 300 facing the power generation transport during the operation mode and the second longitudinal side being the side that is opposite to the first longitudinal side.

FIGS. 6A-6B show that the ventilation air duct 620 is defined in the base frame 305 of the air handling transport 300. As shown in FIG. 6B, the base frame 305 underneath the air housing 310 may include two beams 612 that are connected by crossbeams 614, with the top flanges of the beams 612 connected by base plate 610B and the bottom flanges of the beams 612 connected by base plate 610A. For example, the beams 612 and/or crossbeams 614 may be I-beams, H-beams, and the like. As another example, they may be poles, plates, rods, pipes, or any other structure that reinforces and/or forms the base frame 305. The beams 612, and the bottom and top base plates 610A-B may thus define the ventilation air duct 620 in the base frame 305 where the filtered ventilation air may flow after being filtered into the ventilation air compartment 344. FIG. 6B shows a view where the bottom base plate 610A has been removed to reveal the interior of the ventilation air duct 620. While the embodiment of FIGS. 6A-6B shows a single ventilation air duct connecting the ventilation air compartment 344 and the ventilation air plenum 342, other embodiments may include two separate ducts defined in the base frame 305. Other configuration where the ventilation air duct is defined on a longitudinal side or a top side of the air handling transport are also envisioned and considered to be within the scope of this disclosure.

FIG. 6B further shows that the ventilation air compartment 344 includes a plurality of blowers 630. In one or more embodiments, the blowers may be high-powered fans to apply suction force to cause ambient air to flow and filter into the ventilation air compartment from the filters 346 on at least three sides of the air housing 310 and cause the filtered ventilation air to flow into the ventilation air duct 620. In the embodiment shown in FIGS. 3-6B, the ventilation air compartment 344 includes more than double the number of fans and filters (e.g., four fans and up to 36 filters) than conventional systems, thereby maximizing filtration and providing full redundancy and fan serviceability on the fans. Increasing the number of filters also overcomes the problems of conventional systems where the filters get dirtier quicker and need to be changed more frequently as with the updated design. Also, providing the ventilation air compartment 344 on the end side of the air housing 310 that is opposite to the end side of the air housing that is adjacent to the exhaust stack 315 ensures the hot exhaust air released from the exhaust stack 315 does not flow into the filters 346 of the ventilation air compartment 344. This configuration ensures that the filtered ventilation and cooling air flowing out of the ventilation air plenum 342 and into the enclosure of the gas turbine can absorb the heat radiated from the gas turbine and cool the gas turbine down adequately during operation.

FIG. 6B also shows that opening 640 connects the ventilation air duct 620 with the ventilation air plenum 342. A flow path for the ventilation air may thus extend into the ventilation air compartment from the air filters 346 on the three sides of the air housing 310, flow through the blowers 630, turn 90° and flow through the ventilation air duct 620, turn 90° again as the ventilation air enters the opening 640 and up into the ventilation air plenum 342.

In the embodiment shown in FIGS. 6A-6B, the plurality of fans 630 in the ventilation air compartment 344 feeding the filtered air in the ventilation air compartment 344 into the ventilation air duct 620 and out of the ventilation air plenum 342. In other embodiments, the ventilation air compartment 344 may be connected to the ventilation air plenum 342 by two or more ventilation air ducts. In this case, for example, two of the fans 630 may feed the filtered air in the ventilation air compartment 344 into a first air duct and out of the ventilation air plenum 342, and the other two fans 630 may feed the filtered air into a second air duct and out of the ventilation air plenum 342.

FIGS. 3-6B also show that the generator exhaust air module 350 is mounted to the base frame 305 and includes a generator exhaust air plenum 352 and a generator exhaust air compartment 354 including silencers (not shown) mounted therein and a vent 356. The silencers silence generator exhaust air received at the generator exhaust air plenum 352 from a compartment housing the generator mounted on the power generation transport. The generator exhaust air compartment 354 may output the silenced air from the vent 356 provided on a roof of the air handling transport 300. The ventilation air duct coupling the ventilation air compartment 344 to the ventilation air plenum 342 further extends below the generator exhaust air module 350. That is, the ventilation air duct extends below the ventilation air compartment 344, the generator exhaust air plenum 352, the combustion air compartment 334, the combustion air plenum 332, and the ventilation air plenum 342.

The generator exhaust air compartment 354 may also include fans that draw air into the generator exhaust air plenum 352 from the compartment of the generator on the power generation transport and cause the air to flow through a length of the generator compartment to thereby collect radiant heat from the generator and other electronic and/or electrical components that may be housed in the generator compartment. The heated generator compartment exhaust air flows into and through the generator exhaust air plenum 352 and out through the roof vent 356. Such a configuration for the ventilation and cooling air flow path for the generator compartment results in reduced noise because the generator compartment cooling air is discharged from the vent 356 at the roof of the air housing 310 of the air handling transport 300.

As shown in FIGS. 2-4, the combustion air plenum 332, the ventilation air plenum 342, and the generator exhaust air plenum 352 are mounted on a longitudinal side of the air handling transport 300 that is adapted to face the power generation transport in an operation mode. In the embodiment shown in FIGS. 3-4, the generator exhaust air plenum 352 is disposed between the ventilation air compartment 344 and the combustion air plenum 332 on the longitudinal side of the air handling transport 300. Further, the combustion air plenum 332 is disposed between the generator exhaust air plenum 352 and the ventilation air plenum 342 on the longitudinal side of the air handling transport.

As shown in FIGS. 3-6B, the air handling transport 300 may be equipped with outriggers 360 that are operable using one or more of hydraulics, pneumatics, electric motors, and/or mechanical components. For example, each of the outriggers 360 may include a first hydraulic cylinder that lifts the air handling transport 300 up and a second hydraulic cylinder that moves the transport in the designated orientation or direction. The outriggers 360 may be actuated in the operation mode for lifting and positioning the air handling transport 300 and enabling side-to-side movement and fore-aft movement of the air handling transport 300. That is, the outriggers 360 may enable the air handling transport 300 to move in a direction toward the power generation transport when the power generation transport and the air handling transport 300 are parked next to each other during the transition to the operation mode. Conversely, when transitioning from the operation mode to the transportation mode, the outriggers 360 may enable the air handling transport 300 to move in a direction away from the power generation transport.

In one or more embodiments, to more finely adjust the positioning, alignment, and distance to connect the two transports, the air handling transport 300 may further include expansion connections 331, 341, 351 (e.g., powered slide outs). The expansion connections 331, 341, 351 may respectively move and align the combustion air plenum 332, the ventilation air plenum 342, and the generator exhaust air plenum 352 into position for mating with the corresponding plenums or ports of the power generation transport without attaching the two transports to transportation vehicles (e.g., a tractor or other type of motor vehicle).

As shown in FIG. 3, the combustion air plenum 332 duct, the ventilation air plenum 342 ducts, and the generator exhaust air plenum 352 ducts may be retracted and stored within the air housing 310 during the transportation mode. As shown in FIG. 4, in the operation mode, the expansion connection 331 may cause the combustion air plenum 332 duct to slide outward of the air housing 310 to be in a position where it can connect with the inlet plenum of the gas turbine of the power generation transport. In addition, in the operation mode, the expansion connection 341 may cause the ventilation air plenum 342 ducts to slide outward of the air housing 310 to be in a position where they can mate with the ventilation air intake ports of the enclosure for the turbine on the power generation transport. And still further, in the operation mode, the expansion connection 351 may cause the generator exhaust air plenum 352 ducts to move outward of the air housing 310 to connect with a generator exhaust air outlet of the compartment for the generator mounted on the power generation transport. The expansion connections 331, 341, 351 may be operable using one or more of hydraulics, pneumatics, electric motors, and/or mechanical components.

The outriggers 360 and the expansion connections 331, 341, 351 on the air handling transport 300 increase mobility of the air handling transport 300 by reducing the precision needed when parking the two transports next to each other during operation.

FIGS. 3-6B also show that the air handling transport 300 includes a black start generator 370 mounted to the base frame 305. The black start generator may be configured to provide power to start operation of the mobile source of electricity 102. For example, the black start generator may provide power to the gas turbine on the power generation transport to initialize operation of the gas turbine.

Although not specifically shown in FIGS. 3-6B, the air handling transport 300 may include additional components such as a transformer, an automatic transfer switch (ATS), a battery cabinet, variable frequency drives cabinet, MCC cabinet, UCP controls cabinet, electrical turbine control enclosure, storage enclosure for turbine package supplies and expendables, and the like. The transformer may be configured to receive power at a higher voltage (e.g., 13.8 kV) and step down the voltage (e.g., to 480V) so that it can be utilized for various applications requiring the low voltage. The transformer may be operated via the ATS, that may take in power at a higher voltage (e.g., 13.8 kV), and switch and reduce it to a lower voltage (e.g., 480V) through the transformer for turbine control power. The battery cabinet may include one or more batteries that may provide an alternate source of power and may be utilized to store electric power generated by, e.g., the 480V transformer.

Example Mechanisms for Rotating the Exhaust Stack

The exhaust stack 315 in FIGS. 3-6B is mounted to the base frame 305 via a rotary bearing to enable rotation of the exhaust stack 315 relative to the base frame 305 of the air handling transport 300. In one or more embodiments, the stack base 320 includes a slewing bearing on a bottom surface thereof to allow for rotation of the entire exhaust stack 315 between the longitudinal side in the operation mode (FIGS. 4-5) and the end side in the transportation mode (FIG. 3). The slewing bearing may be actuated by an actuation mechanism such as a hand crank, hydraulics, pneumatics, an electric motor, a pinion gear, a chain drive, a cylinder actuator, or a helac actuator. Some of the actuation mechanisms for rotating the exhaust stack on an air handling transport between transportation mode and operation mode are illustrated in FIGS. 7A-7C.

Figures 7A, 7B, 7C:
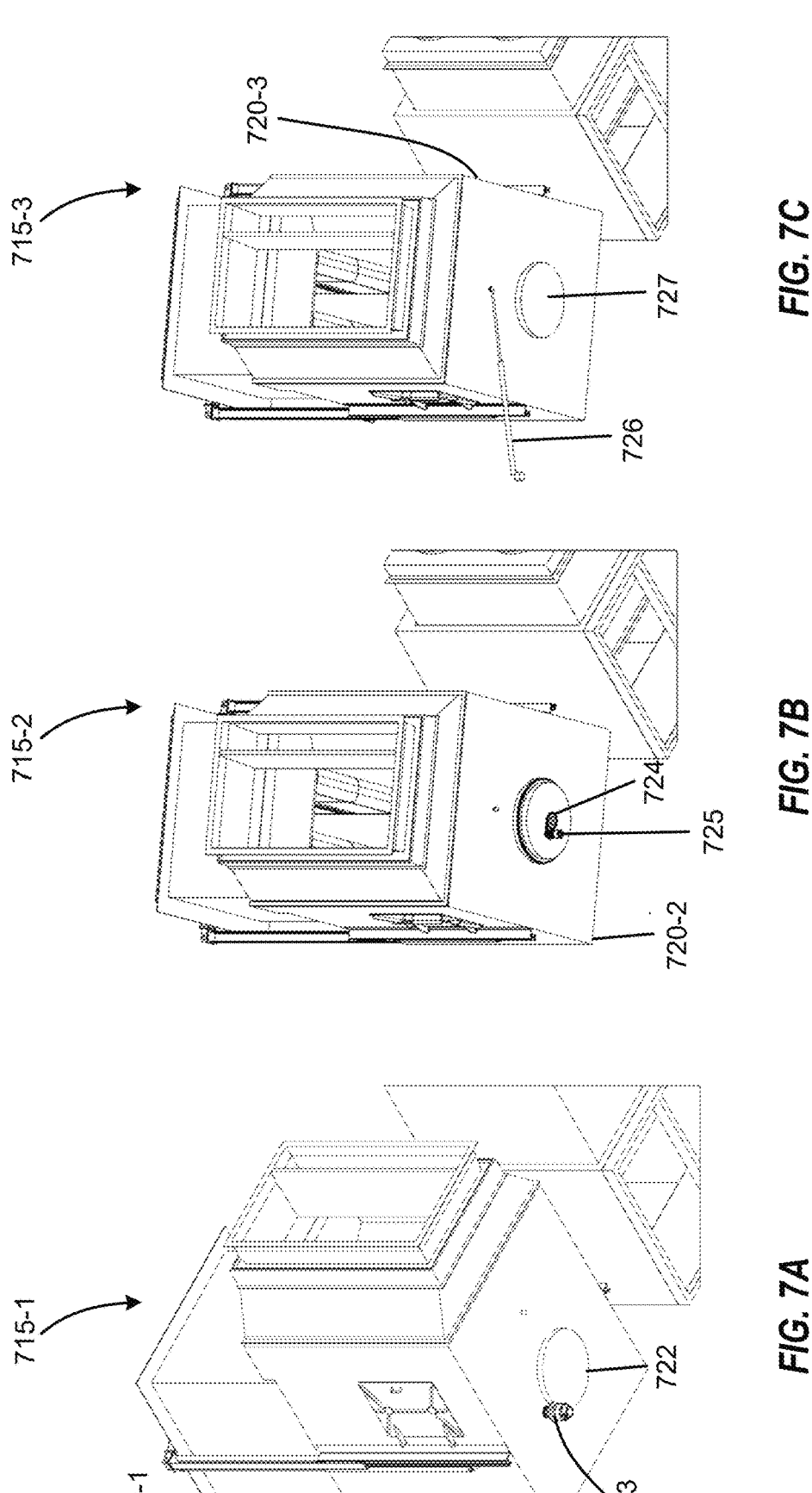
FIGS. 7A-7C are schematic diagrams showing different actuation mechanisms for rotation of an exhaust stack on an air handling transport between transportation mode and operation mode, in accordance with one or more embodiments.

FIG. 7A shows that the actuation mechanism for the exhaust stack 715-1 may be a pinion gear. For example, the stack base 720-1 of the exhaust stack 715-1 may include a gear 722 on a bottom surface thereof that is mated with a pinion 723 mounted on the base frame 305 of the air handling transport 300. The pinion 723 may be actuated using, e.g., an electric motor to engaged with and turn the gear to rotate the exhaust stack 715-1 from the transportation mode to the operation mode.

FIG. 7B shows that the actuation mechanism for the exhaust stack 715-2 may be a chain drive. For example, the stack base 720-2 of the exhaust stack 715-2 may include a gear 724 on a bottom surface thereof that is engaged with a motor 725 via a chain. The motor 725 may be operated to turn the gear and rotate the exhaust stack 715-2 from the transportation mode to the operation mode.

FIG. 7C shows that the actuation mechanism for the exhaust stack 715-3 may be a cylinder actuated rotation. For example, one end of a hydraulic telescoping arm 726 may be pivotably connected to the base frame 305 of the air handling transport 300 and the other end may be pivotably connected to the bottom surface of the stack base 720-3. The hydraulic telescoping arm 726 may then be actuated to expand or retract to thereby cause the exhaust stack to rotate on its axis 727 between the transportation mode and the operation mode. It should be noted that the rotation mechanisms described above in FIGS. 7A-7C are for illustration only and not intended to be limiting. Other rotation mechanisms may be readily apparent to those skilled in the art and are within the scope of this disclosure.

Example Mechanisms for Telescoping the Exhaust Stack

The stack extension 325 of the exhaust stack 315 in FIGS. 3-6B is adapted to retract within the stack base 320 during transportation and to slide out vertically to be in an upright position during operation. The telescoping movement of the stack extension 325 may be achieved by an actuation mechanism that is implemented using hydraulics, pneumatics, an electric motor, a rack and pinion actuator, a cylinder actuator, a lift cable actuator, or a hand crank. One example actuation mechanism for telescoping the exhaust stack on an air handling transport between transportation mode and operation mode is illustrated in FIG. 8.

Figure 8:
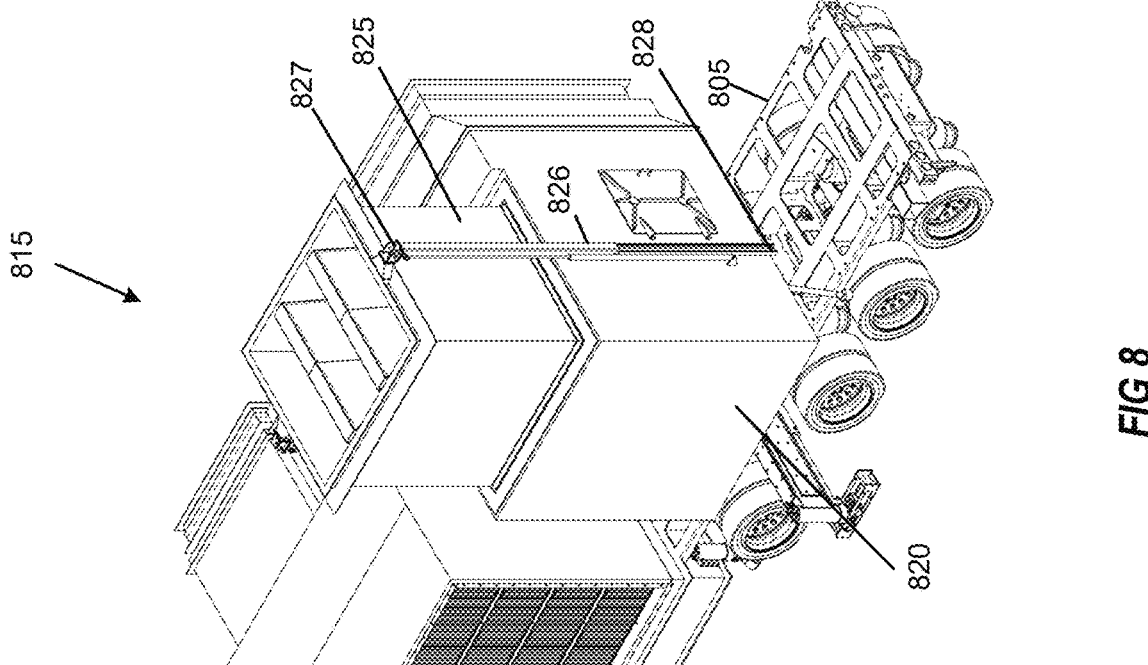
FIG. 8 is a schematic diagram showing a perspective view of an exhaust stack including a stack extension, in accordance with one or more embodiments.

FIG. 8 shows that the exhaust stack 815 is mounted on the base frame 805 and is in the operation mode with the stack extension 825 extended vertically by a predetermined vertical distance (e.g., around 8 feet) from within the stack base 820. FIG. 8 further shows a cylinder actuated exhaust extension for the exhaust stack 815. For example, one end 827 of a hydraulic telescoping arm 826 may be connected to the top of the stack extension 825 and the other end 828 of the hydraulic telescoping arm 826 may be connected to the base frame 805. The hydraulic telescoping arm 826 may then be actuated to expand or retract to thereby cause the stack extension to retract into the stack base 820 or to telescope therefrom to be in the fully upright position. It should be noted that the exhaust extension mechanism described in FIG. 8 is for illustration only and not intended to be limiting. Other exhaust extension mechanisms may be readily apparent to those skilled in the art and are within the scope of this disclosure.

Figure 9:
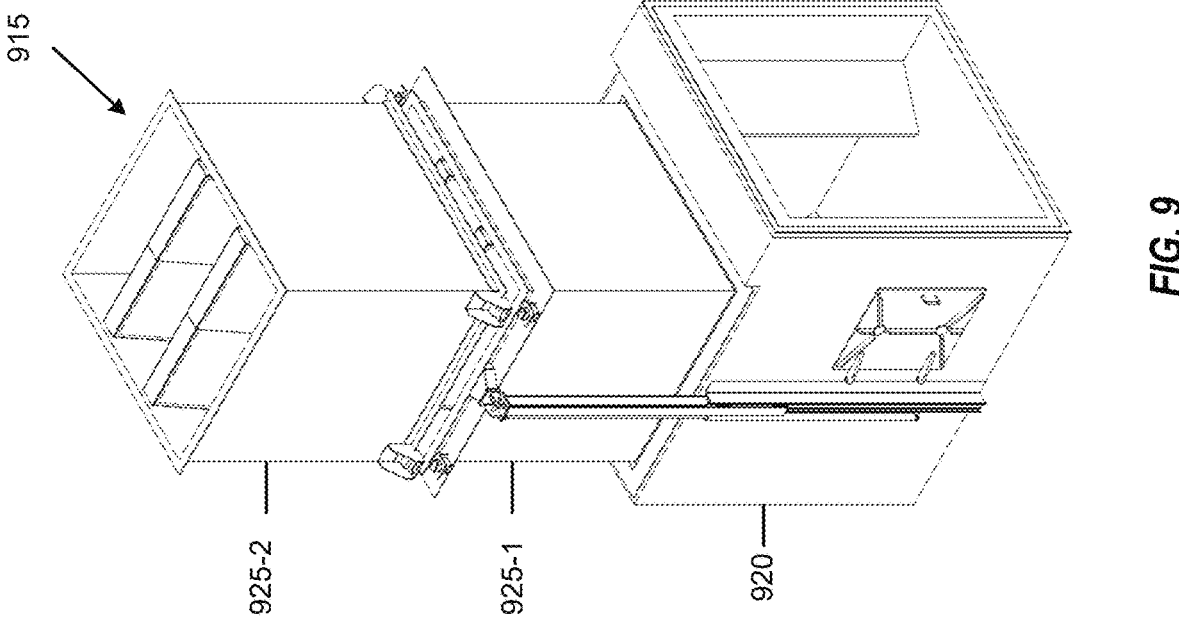
FIG. 9 is a schematic diagram showing a perspective view of an exhaust stack including multiple stack extensions, in accordance with one or more embodiments.

In one or more embodiments, the telescoping movement of the exhaust stack may involve multiple stages of stack extensions. For example, while the embodiment of FIG. 8 illustrates a single stage of stack extension, FIG. 9 illustrates an embodiment with two stages of extensions. More specifically, FIG. 9 shows that the exhaust stack 915 includes a stack base 920, a first stack extension 925-1 and a second stack extension 925-2, the second stack extension 925-2 being housed within the first stack extension 925-1 in the transportation mode and extend vertically by a given distance in the operation mode. Such a configuration may allow the hot exhaust air to be safely released into the atmosphere at an even greater height from the top of the second stack extension 925-2 to thereby prevent posing any danger to equipment and/or personnel working in a vicinity of the power generation system.

Example Mechanisms for Longitudinally Moving the Exhaust Stack

The universal air handling transport according to the present disclosure is adapted to work with different types of power generation transports mounted with different types of gas turbines having different dimensions and power output ratings. To enable this compatibility, the exhaust stack that is adapted to slide in a longitudinal direction of the air handling transport to connect with power generation transports having gas turbines of varying dimensions.

Figure 10A:
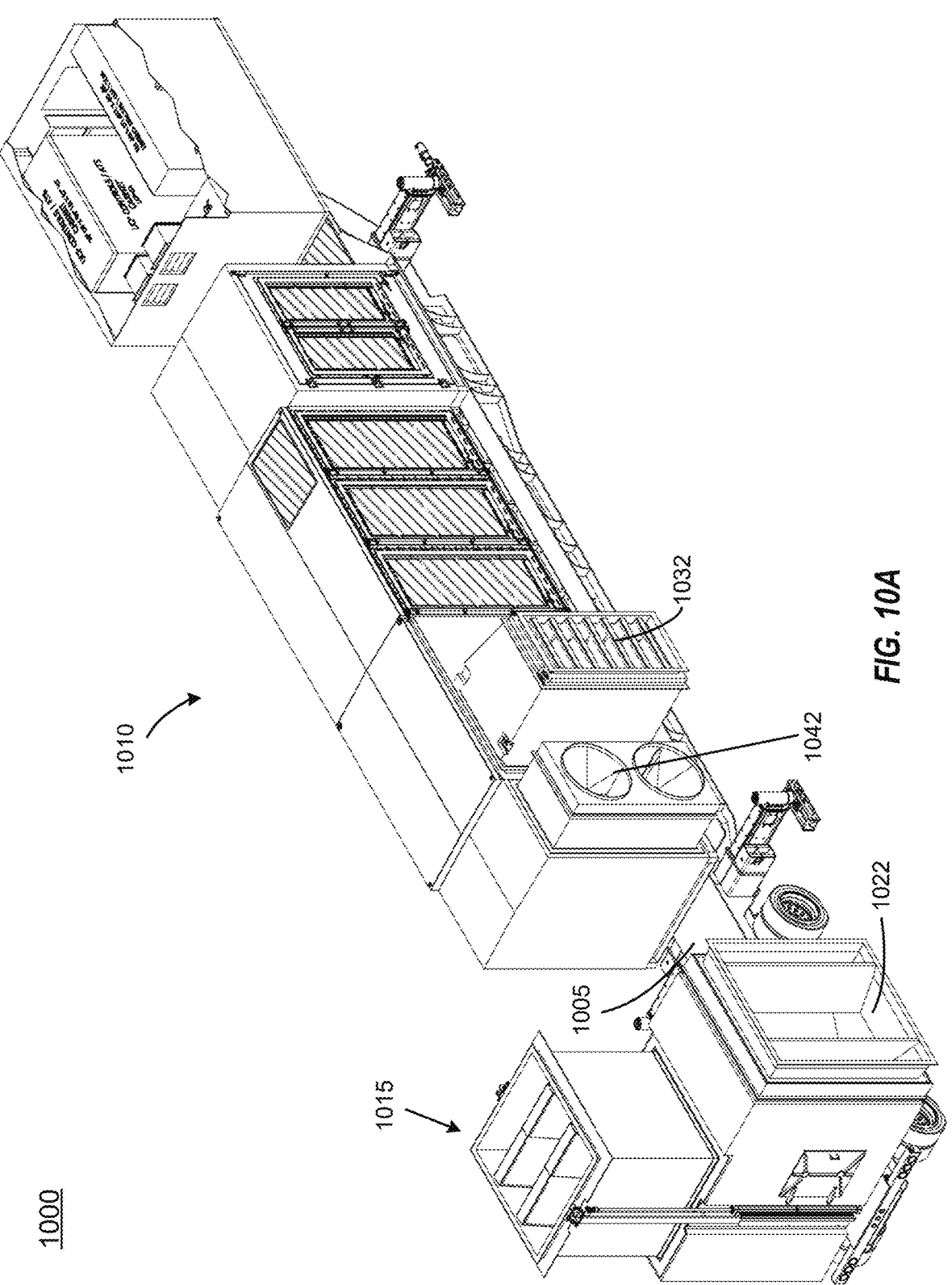
FIG. 10A is a schematic diagram showing a perspective view of an air handling transport in an operation mode, in accordance with one or more embodiments.
Figure 10B:
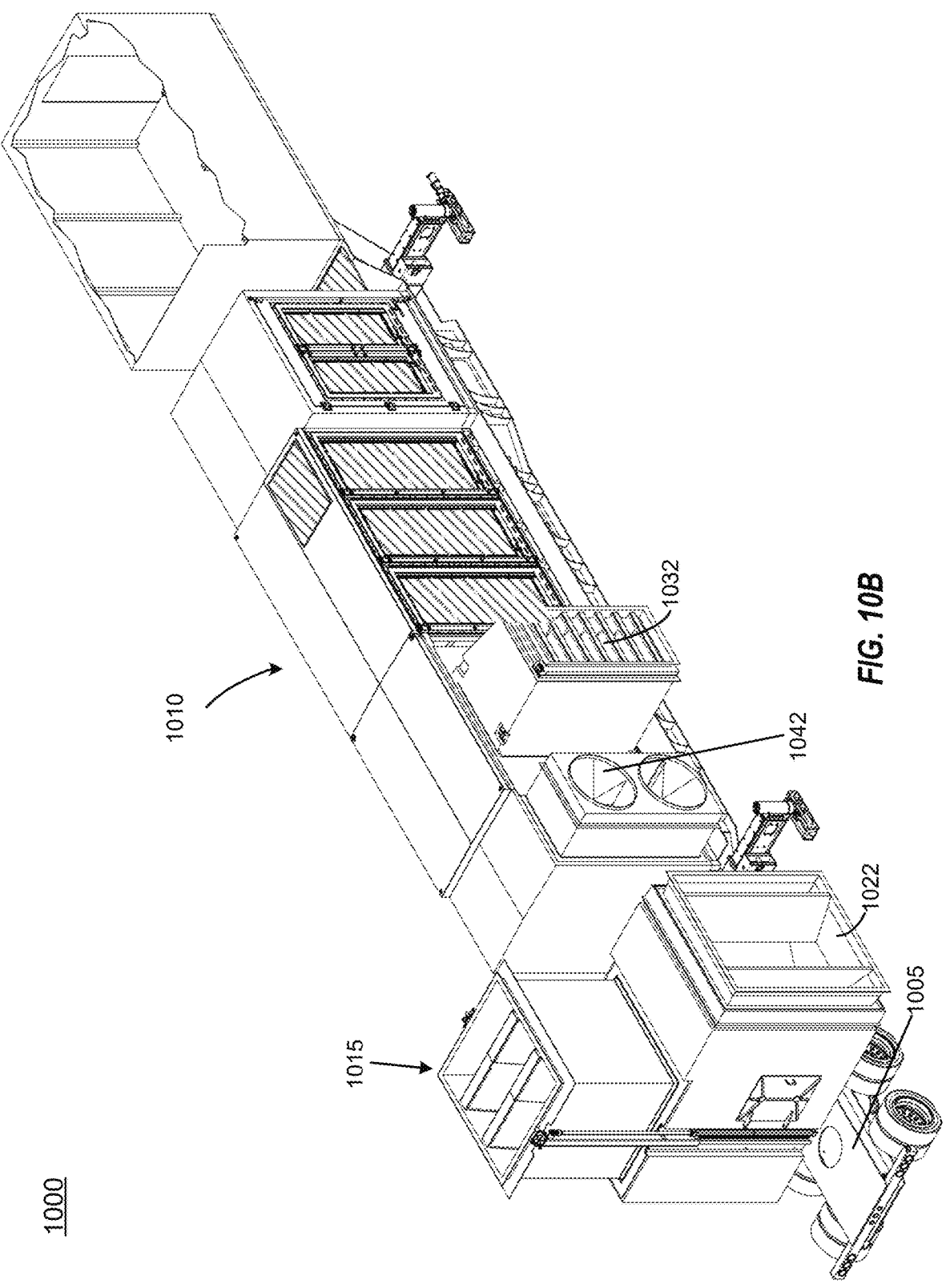
FIG. 10B is a schematic diagram showing a perspective view of an air handling transport in an operation mode, in accordance with one or more embodiments.

FIG. 10A shows an example configuration of an air handling transport 1000 in an operation mode where the exhaust stack 1015 is positioned at a first position to couple with a first type of turbine on a first power generation transport. FIG. 10B shows an example configuration of the air handling transport 1000 in an operation mode where the exhaust stack 1015 is positioned at a second position to couple with a second type of turbine on a second power generation transport. As can be seen from FIGS. 10A-10B, in the first position in FIG. 10A, the exhaust stack 1015 is spaced further apart in the longitudinal direction from the combustion air plenum 1032 and the ventilation air plenum 1042 of the air housing 1010, than in the second position in FIG. 10B. That is, a first distance between the combustion air plenum 1032 and the exhaust plenum 1022 with the exhaust stack 1015 in the second position (FIG. 10B) is less than a second distance between the combustion air plenum 1032 and the exhaust plenum 1022 with the exhaust stack 1015 in the first position (FIG. 10A).

Thus, for example, by configuring the exhaust stack 1015 to be in the first position (FIG. 10A), the universal air handling transport 1000 can be made compatible with a first power generation transport that includes a larger gas turbine (e.g., 38 MW), and by configuring the exhaust stack 1015 to be in the second position (FIG. 10B), the universal air handling transport 1000 can be made compatible with a second power generation transport that includes a smaller gas turbine (e.g., 16 MW). By making the air handling transport 1000 compatible with different power generation transports, the overall power generation system is simplified because it is no longer necessary to provide dedicated air handling transports 1000 for different power generation transports.

The air handling transport 1000 may include a positioning mechanism mounted to the base frame 1005 and/or the bottom surface of the exhaust stack 1015 for moving and setting a position of the exhaust stack 1015 to the first position or the second position in the longitudinal direction of the air handling transport 1000. The positioning mechanism may be implemented using hydraulics, pneumatics, electric motors, mechanical systems, and the like.

Figure 11:
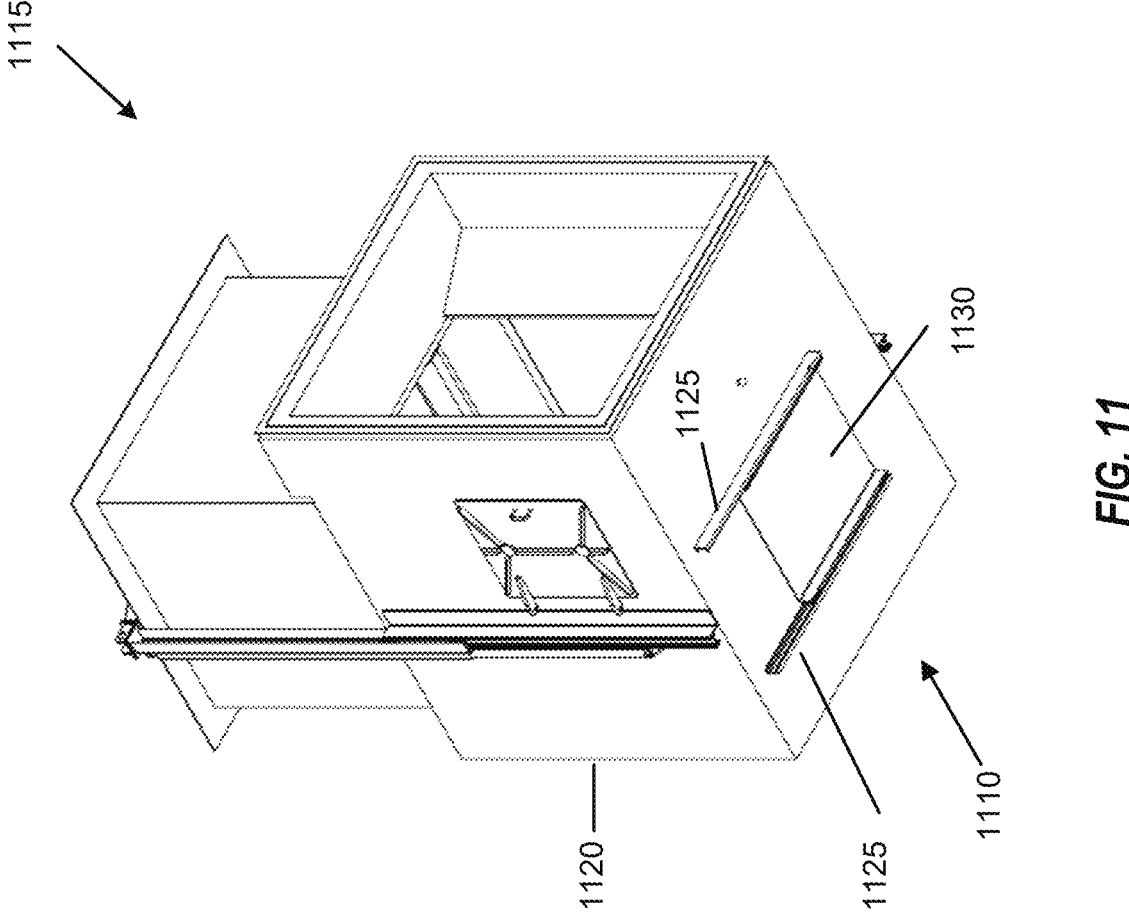
FIG. 11 is a schematic diagram showing a positioning mechanism for moving the exhaust stack in a longitudinal direction of the air handling transport, in accordance with one or more embodiments.

FIG. 11 is a schematic diagram showing an exemplary positioning mechanism 1110 for moving the exhaust stack 1115 in a longitudinal direction of the air handling transport, in accordance with one or more embodiments. For example, as shown in FIG. 11, the stack base 1120 of the exhaust stack 1115 may include guide rails 1125 and a platen 1130 to move the exhaust stack 1115 in the longitudinal direction between the first position and the second position. Other positioning mechanisms for the exhaust stack may be readily apparent to those skilled in the art and are within the scope of this disclosure.

Example Exhaust Air Flow in the Exhaust Stack

Figure 12:
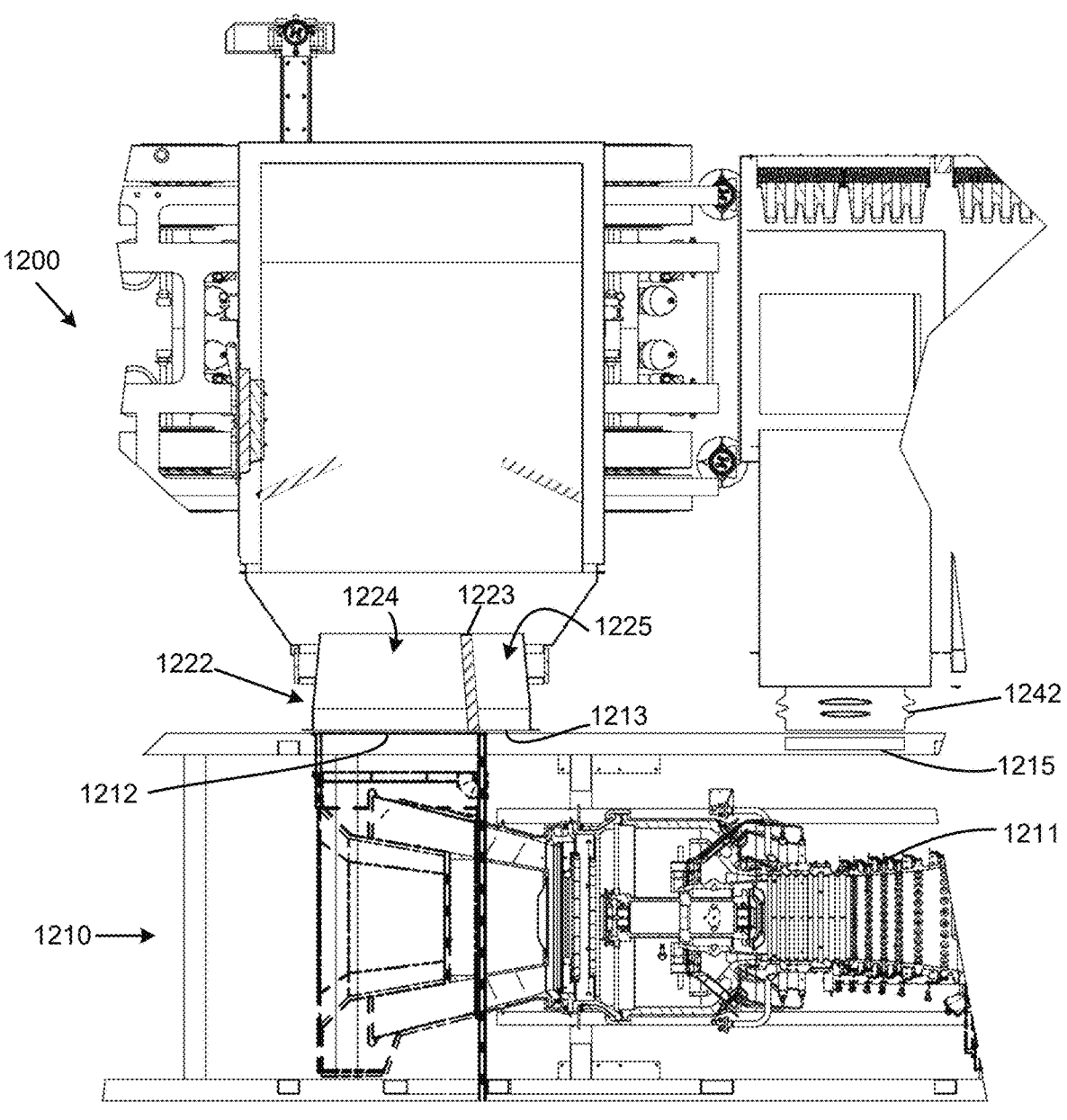
FIG. 12 is a sectional view showing an exhaust connection between the air handling transport and the power generation transport, in accordance with one or more embodiments.

FIG. 12 is a partial view of a flow path for combustion exhaust air and turbine enclosure ventilation and cooling exhaust air when the two transports are connected to each other in the operation mode. FIG. 12 shows that the air handling transport 1200 is connected to the power generation transport 1210 in the operation mode. More specifically, FIG. 12 shows that the ventilation air plenum 1242 is connected to an intake port 1215 for an enclosure for the turbine 1211 mounted on the power generation transport 1210. The filtered ventilation and cooling air entering the enclosure of the gas turbine 1211 from the ventilation air plenum 1242 flows through the enclosure and along an outer surface of the gas turbine 1211 to collect radiant heat of the gas turbine 1211, and the heated enclosure ventilation exhaust air flows out of the power generation transport 1210 from an outlet port 1213 for the enclosure for the turbine 1211 mounted on the power generation transport 1210.

FIG. 12 further shows that the exhaust collector 1212 of the gas turbine 1211 of the power generation transport 1210 in the operation mode is connected to the exhaust plenum 1222 of the air handling transport 1200. As shown in FIG. 12, the exhaust plenum 1222 includes a partition 1223 to define a combustion exhaust air compartment 1224 and an enclosure ventilation air exhaust compartment 1225. In the operation mode, the combustion exhaust air compartment 1224 is connected to the exhaust collector 1212 for the gas turbine 1211, and the enclosure ventilation air exhaust compartment 1225 is connected to the outlet port 1213 for the enclosure for the turbine 1211. The compartments 1224, 1225 defined by the partition 1223 partitioning the distal end of the exhaust plenum 1222 may be adapted to be respectively sealed and mated respectively with the exhaust collector 1212 and the outlet port 1213 on the external surface of the enclosure of the power generation transport 1210 during the operation mode.

Any form of connection may be used that provides the coupling between the compartments 1224, 1225 and the exhaust collector 1212, and the outlet port 1213, without using a crane, forklift, and/or any other external mechanical means to make the connection. In one or more embodiments, the connection may be a flange connection, and the outriggers 360 may be operated to cause the compartments 1224, 1225 to be flanged up, sealed and mated with the exhaust collector 1212 and the outlet port 1213 in the operation mode.

In one or more embodiments, the connection may be an eductor connection, and the outriggers (e.g., outriggers 360 in FIGS. 3-6B) may be operated to cause compartments 1224, 1225 of the exhaust plenum 1222 to stab and seal into the exhaust collector 1212 and the outlet port 1213 of the power generation transport 1210 without having to precisely flange up the compartments 1224, 1225 of the exhaust plenum 1222 with the exhaust collector 1212 and the outlet port 1213 of the power generation transport 1210. The compartments 1224, 1225 of the exhaust plenum 1222 respectively engage with the exhaust collector 1212 and the outlet port 1213 of the power generation transport 1210 such that, e.g., the exhaust air discharged from the exhaust collector 1212 and entering the compartment 1224 does not back feed into outlet port 1213 or the compartment 1225. Instead, all exhaust air flows in one direction toward the stack extension of the exhaust stack and out from the top of the stack extension into the atmosphere, despite any pressure difference between the air flows in the two compartments. The exhaust air entering the exhaust compartments 1224, 1225 from the exhaust collector 1212, and the outlet port 1213 may initially be partitioned by the partition 1223, and subsequently be combined into a single exhaust air flow downstream as the air enters the stack base and the stack extension of the exhaust stack.

Although the embodiment shown in FIG. 12 illustrates the exhaust plenum 1222 as defining two compartments 1224, 1225, respectively for the gas turbine combustion air exhaust and the turbine enclosure ventilation air exhaust, other embodiments may define additional compartments within the exhaust plenum 1222 for combining and releasing additional exhaust air flow paths through the exhaust plenum 1222 and the exhaust stack of the air handling transport 1200. For example, the power generation transport may be designed such that the exhaust air outlet port for the generator compartment may be provided adjacent to the exhaust collector 1212 and the outlet port 1213, and the generator compartment air exhaust flow may be made to flow into the plenum 1222 and out from the top of the exhaust stack. As another example, the power generation transport may include a compartment including radiators and fans for cooling lube oil and the heated air flowing out of the radiators may also be caused to flow out of the side of the power generation transport from a port adjacent to the ports 1212 and 1213, and into the exhaust plenum 1222 and out of the top of the exhaust stack of the air handling transport 1200.

Example Methods of Producing Mobile Electric Power

FIG. 13 is a flow chart illustrating a process 1300 for converting an air handling transport to an operation mode for generating mobile electric power, in accordance with one or more embodiments.

A mobile source of electricity 102 may be transported 1302 to a location where mobile electric power is needed. As shown in FIGS. 2-12, the mobile source of electricity 102 includes the power generation transport and the air handling transport that are separately and independently movable in the transportation mode, and that connect with each other during the operation mode without requiring any external mechanical apparatus.

The mobile source of electricity 102 may be converted from the transportation mode to the operation mode by rotating 1304 the exhaust stack (e.g., exhaust stack 315 in FIGS. 3-4) mounted on an air handling transport (e.g., air handling transport 300), the exhaust stack including a stack base (e.g., stack base 320 in FIGS. 3-4) having an exhaust plenum (e.g., exhaust plenum 322 in FIGS. 3-4) and a stack extension (e.g., stack extension 325 in FIGS. 3-4), the stack extension being housed within the stack base in a transportation mode (FIG. 3).

At block 1306 the stack extension may be raised vertically by a predetermined vertical distance. As shown, for example, in FIGS. 3-4, the telescoping exhaust stack 315 is positioned to be in the upright position by raising the stack extension 325 by a predetermined vertical distance using an actuation mechanism (e.g., hydraulics).

At block 1308, first and second expansion connections (e.g., 331, 341 in FIG. 4) are operated to extend a combustion air plenum (e.g., plenum 332 in FIG. 4) outward from an air housing (e.g., housing 310 in FIG. 4) of the air handling transport, and extend a ventilation air plenum (e.g., plenum 342 in FIG. 4) outward from the air housing of the air handling transport.

At block 1310, the combustion air plenum is aligned and connected with the inlet plenum of the turbine of the power generation transport, and the ventilation air plenum is aligned and connected with an intake of an enclosure for the turbine on the power generation transport. Outriggers (e.g., outriggers 360 in FIGS. 3-4) may be operated to finely control front-back and fore-aft movements of the air handling transport to perform the alignment and connection operation of block 1310.

At block 1312, the exhaust plenum (e.g., plenum 322 in FIGS. 3-4) is connected to an exhaust collector of a turbine of a power generation transport between a longitudinal facing side of the air handling transport and a longitudinal facing side of the power generation transport (e.g., FIGS. 2 and 12). At block 1314, electricity is generated by providing rotational energy of the turbine to a generator mounted on the power generation transport.

FIG. 14 is a flow chart illustrating a process 1400 for generating mobile electric power, in accordance with one or more embodiments. At block 1402, filtered combustion air is output from a combustion air plenum of a combustion air module mounted to a base frame of an air handling transport to an intake of a gas turbine mounted on a separate power generation transport. For example, as shown in FIGS. 2-6B, filtered combustion air entering into the combustion air compartment from filters 336 is output from the combustion air plenum 332 and into the inlet plenum 224 (FIG. 2) of the turbine 222 for combustion.

At block 1404, filtered ventilation air is output from a ventilation air plenum of a ventilation air module mounted to the base frame of the air handling transport to an intake of an enclosure for the gas turbine mounted on the separate power generation transport, wherein the ventilation air module includes a ventilation air compartment and a ventilation air duct, wherein the ventilation air duct is in the base frame and extends below the ventilation air compartment, the combustion air module, and the ventilation air plenum, the ventilation air duct coupling the ventilation air compartment to the ventilation air plenum. For example, as shown in FIGS. 2-6B and 12, filtered ventilation air entering the ventilation air compartment from filters 346 flows into the duct 620 and is output from the ventilation air plenum 342 and into the intake port 1215 of the enclosure of the turbine on the power generation transport for ventilating the enclosure of the gas turbine and cooling the gas turbine.

At block 1406, rotational energy of the gas turbine is transmitted to a generator mounted on the separate power generation transport to generate the mobile electric power.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An air handling transport comprising:

a base frame;

a combustion air module mounted to the base frame; and a ventilation air module mounted to the base frame, wherein the ventilation air module includes a ventilation air compartment, a ventilation air duct, and a ventilation air plenum, and wherein the ventilation air duct extends below the combustion air module, the ventilation air duct coupling the ventilation air compartment to the ventilation air plenum.

2. The air handling transport of claim 1, wherein the ventilation air duct is in the base frame, the ventilation air duct further extending below the ventilation air compartment and the ventilation air plenum.

3. The air handling transport of claim 1, wherein the combustion air module includes a combustion air plenum for providing filtered combustion air to a turbine mounted on a separate transport, and wherein the ventilation air module provides filtered ventilation air to an enclosure for the turbine mounted on the separate transport.

4. The air handling transport of claim 3, further comprising:

a generator exhaust air module mounted to the base frame, the generator exhaust air module including a generator exhaust air plenum receiving generator exhaust air from a compartment for a generator mounted on the separate transport, wherein the ventilation air duct further extends below the generator exhaust air module.

5. The air handling transport of claim 4, wherein the generator exhaust air module includes silencers and a vent, the silencers silencing the generator exhaust air received at the generator exhaust air plenum and outputting silenced air from the vent provided on a roof of the air handling transport.

6. The air handling transport of claim 4, wherein the combustion air plenum, the ventilation air plenum, and the generator exhaust air plenum are mounted on a longitudinal side of the air handling transport that is adapted to face the separate transport in an operation mode.

7. The air handling transport of claim 6, wherein the generator exhaust air plenum is disposed between the ventilation air compartment and the combustion air plenum on the longitudinal side of the air handling transport.

8. The air handling transport of claim 7, wherein the combustion air plenum is disposed between the generator exhaust air plenum and the ventilation air plenum on the longitudinal side of the air handling transport.

9. The air handling transport of claim 4, wherein the combustion air module includes a combustion air compartment including filters to provide the filtered combustion air to the combustion air plenum, and wherein the ventilation air duct extends below the ventilation air compartment, the generator exhaust air plenum, the combustion air compartment, the combustion air plenum, and the ventilation air plenum.

10. The air handling transport of claim 4, further comprising:

a first expansion connection for moving the combustion air plenum outward to connect with a combustion air intake of the turbine on the separate transport during an operation mode;

a second expansion connection for moving the ventilation air plenum outward to connect with a ventilation air intake of the enclosure for the turbine on the separate transport during the operation mode; and a third expansion connection for moving the generator exhaust air plenum outward to connect with a generator exhaust air outlet of the compartment for the generator mounted on the separate transport.

11. The air handling transport of claim 1, further comprising:

an exhaust stack mounted on the base frame and including a stack base having an exhaust plenum and a stack extension, the stack extension being housed within the stack base in a transportation mode and extend vertically by a predetermined vertical distance in an operation mode.

12. The air handling transport of claim 11, wherein the ventilation air compartment is on a first side of the ventilation air plenum, and the exhaust stack is on a second side of the ventilation air plenum, the first side being opposite to the second side.

13. The air handling transport of claim 1, wherein the ventilation air compartment includes air filters mounted on at least three sides of the air handling transport.

14. The air handling transport of claim 13, wherein the ventilation air compartment further includes a plurality of blowers to cause ambient air to flow into the ventilation air compartment from the at least three sides via filters, flow through the ventilation air duct, and flow out of the ventilation air plenum.

15. The air handling transport of claim 14, wherein the plurality of blowers include first and second sets of fans, and the ventilation air duct includes first and second air ducts, the first set of fans feeding filtered air in the ventilation air compartment into the first air duct and out of the ventilation air plenum, and the second set of fans feeding the filtered air into the second air duct and out of the ventilation air plenum.

16. The air handling transport of claim 14, wherein the plurality of blowers include a plurality of fans in the ventilation air compartment, the plurality of fans feeding filtered air in the ventilation air compartment into the ventilation air duct and out of the ventilation air plenum.

17. The air handling transport of claim 1, further comprising:

a plurality of outriggers for lifting and positioning the air handling transport in an operation mode, the plurality of outriggers enabling side-to-side movement and fore-aft movement of the air handling transport.

18. A system for generating mobile electric power, the system comprising:

a power generation transport including a gas turbine and a generator; and an air handling transport comprising:

a base frame;

a combustion air module mounted to the base frame; and a ventilation air module mounted to the base frame, wherein the ventilation air module includes a ventilation air compartment, a ventilation air duct, and a ventilation air plenum, and wherein the ventilation air duct extends below the combustion air module, the ventilation air duct coupling the ventilation air compartment to the ventilation air plenum.

19. The system of claim 18, wherein the ventilation air duct is in the base frame, the ventilation air duct further extending below the ventilation air compartment and the ventilation air plenum.

20. A method for generating mobile electric power, the method comprising:

outputting, from a combustion air plenum of a combustion air module mounted to a base frame of an air handling transport, filtered combustion air to an intake of a gas turbine mounted on a separate power generation transport;

outputting, from a ventilation air plenum of a ventilation air module mounted to the base frame of the air handling transport, filtered ventilation air to an intake of an enclosure for the gas turbine mounted on the separate power generation transport, wherein the ventilation air module further includes a ventilation air compartment, and a ventilation air duct, and wherein the ventilation air duct extends below the combustion air module, the ventilation air duct coupling the ventilation air compartment to the ventilation air plenum; and transmitting rotational energy of the gas turbine to a generator mounted on the separate power generation transport to generate the mobile electric power.

* * * * *